United States Patent [19]

Trueblood

[11] Patent Number: 5,675,755
[45] Date of Patent: Oct. 7, 1997

[54] WINDOW SYSTEM PREVENTING OVERLAP OF MULTIPLE ALWAYS-VISIBLE WINDOWS

[75] Inventor: John Warren Trueblood, San Diego, Calif.

[73] Assignees: Sony Corporation, Tokyo, Japan; Sony Electronics, Inc., Park Ridge, N.J.

[21] Appl. No.: 482,184

[22] Filed: Jun. 7, 1995

[51] Int. Cl.$^6$ .................................................. G06F 3/00
[52] U.S. Cl. ........................ 395/346; 395/342; 395/344
[58] Field of Search .................................... 395/155–161, 395/326–358; 345/117–120

[56] References Cited

U.S. PATENT DOCUMENTS

| | | | |
|---|---|---|---|
| 4,783,648 | 11/1988 | Homma et al. | 340/724 |
| 4,890,257 | 12/1989 | Anthias et al. | 395/157 |
| 5,060,170 | 10/1991 | Bourgeois et al. | 395/158 |
| 5,142,618 | 8/1992 | Fujiwara et al. | 395/157 X |
| 5,371,847 | 12/1994 | Hargrove | 395/157 |
| 5,436,637 | 7/1995 | Gayraud et al. | 395/155 X |
| 5,487,143 | 1/1996 | Southgate | 395/157 |
| 5,513,342 | 4/1996 | Leong et al. | 395/157 |

FOREIGN PATENT DOCUMENTS

| | | | |
|---|---|---|---|
| 438877A2 | 7/1991 | European Pat. Off. | G06F 3/033 |
| 2693810 | 1/1994 | France | G06F 3/14 |

OTHER PUBLICATIONS

Research Disclosure, Anonymous, "Method to Allow Users to Select Transparent Color for Windows", No. 3347, Mar. 1, 1993, p. 206.

Research Disclosure, Anonymous, "Automatic Tiling of Arbitrary Objects", No. 344, Dec. 1, 1992, p. 943.

IBM Technical Disclosure Bulletin, "Free–Space Search for Best–Fit Placement of New Desktop Objects", vol. 37, No. 1, Jan. 1994, New York, pp. 455–456.

IBM Technical Disclosure Bulletin, Anonymous, "Transparent Window Selection", vol. 30, No. 11, Apr. 1988, New York, pp. 268–270.

Grimes, "Objects 101—An Implementation View", IEEE, 1994, pp. 106–111.

Bonner, "Visual Programming Techniques", Window Sources, Oct. 1993, p. 405 (3).

Bonner, "Visual Programming Techniques", Window Sources, Dec. 1993, p. 377 (3).

Faison, "Putting the OWL 2.0 Class Library for Windows Through its Paces", Microsoft Systems Journal, Feb. 1994, p. 45 (18).

Prosise, "What's On Top? Windows' Z–Order Figures It Out.", PC Mag., Mar. 15, 1994, p. 311 (3).

Myers, "A Taxonomy of Window Manager User Interfaces", IEEE, Sep. 1988, pp. 65–84.

PC Tools for Windows, Version 2., 1994, (Central Point Software, Inc.), p. 119.

*Primary Examiner*—John E. Breene
*Attorney, Agent, or Firm*—Blakely, Sokoloff, Taylor & Zafman

[57] ABSTRACT

A method and apparatus for establishing an always-visible class of windows in a computer-implemented windowing environment is provided. A user may designate one or more windows as always-visible windows. If an always-visible window overlaps with a non-always-visible window, then the always-visible window is displayed on top of the non-always-visible window. Always-visible windows are prevented from overlapping with each other. Techniques are provided for implementing the always-visible window class in a manner that complies with the X Windows system. According to one technique, the override redirect attribute is used as a flag to designate which windows are always-visible windows. According to an alternative technique, a list of always-visible windows is maintained as a property attached to a root window.

21 Claims, 18 Drawing Sheets

WINDOW SYSTEM PREVENTING OVERLAP OF MULTIPLE ALWAYS-VISIBLE WINDOWS

FIELD OF THE INVENTION

The present invention relates to window management on computer systems, and more specifically, to a method and apparatus for displaying a class of always-visible windows in an X Windows system.

BACKGROUND OF THE INVENTION

A window is a user interface object that establishes a correlation between a particular set of data and a particular screen region. Unless the window is hidden or covered by another user interface object, the set of data is typically displayed in the corresponding screen region. The use of windows has proven to be an effective way of communicating information to a computer user. For example, a word processing system that allows a user to open multiple documents may provide a separate window for displaying the contents of each of the open documents.

For added flexibility, many window management systems allow windows to overlap with each other. Two windows overlap when there is an intersection between the screen regions associated with the windows. If the contents of two or more overlapping windows are displayed in the common screen region, the information may appear garbled and difficult to read. Consequently, the window management system must determine what should be displayed in the region that is common to overlapping windows.

To address this problem raised by overlapping windows, most window management systems assign each window a position in a "stack order". When multiple windows share the same screen region, only the information from the window that has the higher position in the stack order is shown in the screen region. Thus, the portion of the lower-ordered window that corresponds to the common screen region will be "covered" by the portion of the higher-ordered window that corresponds to the common screen region. To a user, this makes the lower-ordered window appear as if it were physically below the higher-ordered window.

Most window management systems allow users to move, resize and change the stack order of individual windows. For example, in the System 7 operating system available from Apple Computer, Inc., a window assumes the highest position in the stack order when a user clicks on a portion of the window using an input device such as a mouse or trackball. A window is resized by dragging the bottom corner of the window until the window has the desired dimensions. A window is moved by dragging the title bar of the window to a new position on the screen display.

In some applications, it may be important to ensure that certain information is always visible to the user. However, if the information is displayed in a window in a system that allows windows to overlap, then the vital information may become hidden from the user. For example, the information may become covered if the user performs some action that would cause a window that is higher in the stack order to overlap with the given window. Numerous types of user actions can cause this situation to arise. For example, the user may cause an already-overlapping window to assume a position in the stack order that is higher than the position of the given window. Alternatively, the user may move a window that is already higher in the stack order to a screen position that overlaps with the given window.

Various attempts have been made to prevent important information displayed in a window from becoming hidden to the user. For example, PC Tools for Windows provides a window-based graphical desktop that allows a user to specify that a window should remain "always on top". The "always on top" window is assigned a position in the stack order that is higher than the highest position assigned to ordinary windows. Consequently, if any window is manipulated in such a way as to overlap with the "always on top" window, the overlapping portion of the "always on top" window will cover the other window in the common screen region.

This approach works well as long as there is only one window that contains crucial information. However, a problem arises when more than one "always on top" window is needed. In PC Tools for Windows, if two windows are designated as "always on top" windows, they behave the same with respect to each other as normal windows do with respect to each other. That is, one "always on top" window will have a higher stack order position than the other. When the two "always on top" windows are caused to overlap, the higher-ordered window will cover the lower-ordered window in the common screen region. The information contained in the covered portion of the lower-ordered window is no longer visible to the user. Thus, when more than one "always on top" window is displayed, there is no way to ensure that critical information will always be visible to the user.

One way to avoid this problem is to allow only one "always on top" window at a time. For example, French Patent Publication number 2,693,810 describes a window management system that provides one window that cannot be obscured by other windows. When a user designates a second window as a non-obscurable window; the first non-obscurable window ceases to be non-obscurable. Because this system does not support multiple non-obscurable windows, its utility is limited.

Based on the foregoing, it is clearly desirable to provide a windowing system that allows information to be simultaneously displayed in multiple always-visible windows. Further, it is desirable to provide an always-visible class of windows in a window management system that is consistent with the current X-Windows standards. In addition, it is desirable to provide a windows management system that allows users to combine window attributes including an always-visible attribute and a transparent background attribute.

SUMMARY OF THE INVENTION

A method and apparatus for establishing an always-visible class of windows in a computer-implemented windowing environment is provided. A user may designate one or more windows as always-visible windows. If an always-visible window overlaps with a non-always-visible window, then the always-visible window is displayed on top of the non-always-visible window. Always-visible windows are prevented from overlapping with each other. Techniques are provided for implementing the always-visible window class in a manner that complies with the X Windows system. According to one technique, the override redirect attribute is used as a flag to designate which windows are always-visible windows. According to an alternative technique, a list of always-visible windows is maintained as a property attached to a root window.

According to one aspect of the invention, a method for displaying information on a display device of a computer system is provided. According to the method, information is simultaneously displayed in a plurality of windows on the display device. The plurality of windows includes a first always-visible window. A plurality of configurations that correspond to the plurality of windows is maintained. Specifically, the configuration for each window is maintained to reflect the location and dimensions of the window on the display device.

An event that causes a portion of a second window to occupy a common region on the display device with a portion of the first always-visible window is detected. Upon detecting such an event, it is determined whether the second window is also an always-visible window. If the second window is an always-visible window, then the configuration of one or both of the windows is altered to prevent overlap between the windows. If the second window is not an always-visible window, then the first window is displayed over the second window.

According to another aspect of the invention, a stack order is maintained for the plurality of windows. User input is received which causes the second window to have a higher position in the stack order than the first always-visible window. If the second window is not an always-visible window, then the stack order is altered to cause the first always-visible window to have a higher position in the stack order than the second window.

Various techniques may be used to designate a window as an always-visible window. According to one embodiment, the override-redirect attribute provided in the X-windows system is used as a flag to designate always-visible windows. According to another embodiment, a property attached to the root window is defined as an always-visible window list. To designate a window as an always-visible window, an entry that identifies the window is added to the always-visible window list. Both of these techniques may be used without deviating from the X-Windows standard.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for simultaneously displaying multiple always-visible windows is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
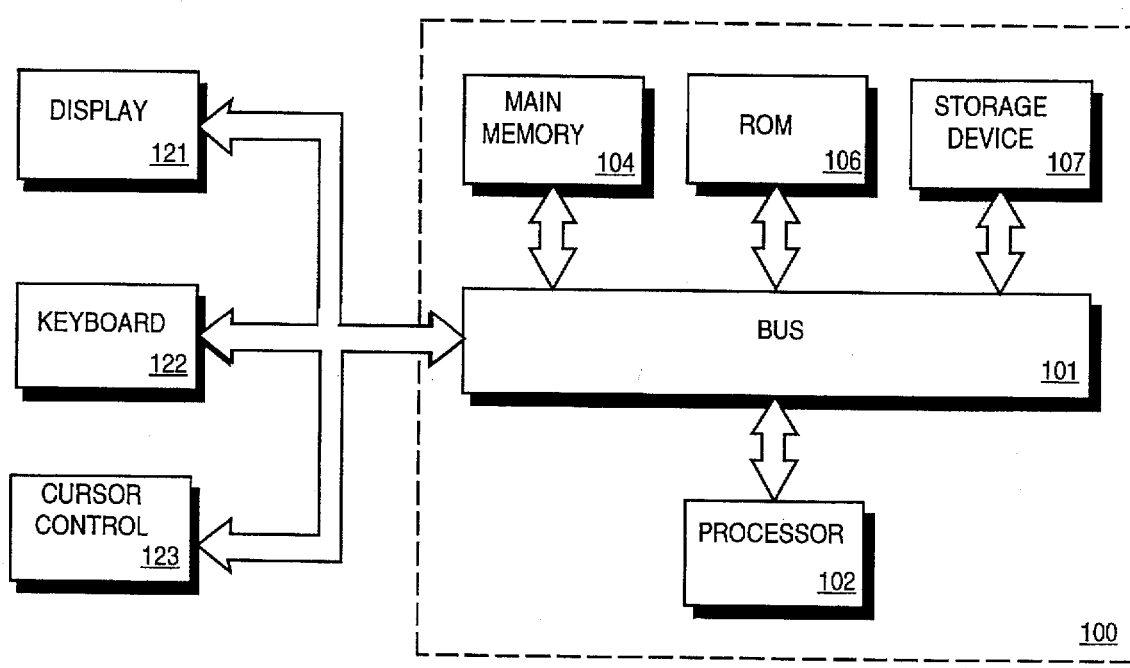
FIG. 1 illustrates a computer system upon which the preferred embodiment of the present invention can be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 as a platform to execute application programs that support the display of multiple always-visible windows. The preferred embodiment of the present invention has been designed for use with the X-Windows system. The X-Windows system was originally developed by MIT's Project Athena and Digital Equipment Corporation, and is now managed by the X Consortium. The X-Windows system is described in detail in *Xlib Reference Manual*, volumes 1 and 2, O'Reilly & Associates, Inc. (1995).

In the X-Windows system, functionality is distributed between client applications and a server application. The client and server applications may be executing on a single processor on a single workstation, or may be distributed among multiple processors on multiple workstations that are connected over a network.

Client Applications

The client applications transmit requests to the server application. The requests may include requests for the performance of a specified operation, or requests for information. The server application responds to the requests by performing the specified operation, or by sending a reply to the client application that includes the requested information.

Server Applications

In addition to servicing requests, the server application sends event messages and error messages to client applications. Event messages inform the client applications that some event has occurred. Typically, the client applications are designed to perform some action upon the receipt of certain event messages. Error messages notify the client that a previous request from the client was invalid.

The server application maintains complex abstractions of resources. Such resources may include, for example, windows, pixmaps, colormaps, cursors, fonts, and graphics contexts. The abstractions for a resource contain attributes for the resource. For example, the abstraction for a window includes information about the size, position, border width and stacking order of the window (the "configuration" of the window).

Because the abstractions are maintained with the server, only one copy of the abstractions is required, regardless of how many clients use the resources. Since clients do not have access to the abstractions themselves, the clients must transmit requests to the server application to manipulate or retrieve information about the resources. When a client transmits a request that relates to a resource, the client identifies the resource with an integer ID that corresponds to the resource. Since only an integer ID is sent rather than a complex abstraction, the traffic between the clients and the server is reduced.

The Window Manager

One special purpose client application is referred to as the window manager. The window manager is a client application that has certain special responsibilities. Specifically, the window manager mediates competing demands for the physical resources of a display, including screen space and the colormap. Typically, the window manager causes the server application to generate a user interface that allows a user to move windows about on the screen, resize windows, and start new applications.

When a client application requests a change in the configuration of a window, the client application sends a request to the server. However, since the request relates to a responsibility controlled by the window manager, the server application does not service the request. Instead, the server application cancels the request and transmits an event message that contains the arguments of the reconfiguration request to the window manager to inform the window manager of the reconfiguration request. The window manager then determines whether the modifications specified in the reconfiguration request should be performed, modified, or denied. If the window manager determines that the modifications should be performed, then the window manager sends the reconfiguration request to the server. Because the reconfiguration request is from the window manager, the server services the reconfiguration request. If the window manager determines that the reconfiguration request should be modified, then the window manager sends a modified reconfiguration request to the server application. The process of sending reconfiguration requests to the window manager for approval before the server acts upon the reconfiguration requests is referred to as substructure redirection.

Window Attributes

As mentioned above, the server application maintains complex data structures that contain information about resources. In addition to a window's configuration, the data structure for a window includes information about how the window is to look and act. This information is referred to as window attributes. One attribute of a window is referred to as Substructure Redirect Override. The Substructure Redirect Override attribute determines whether a window would be allowed to be mapped on the screen without intervention by the window manager.

Always Visible Windows

The present invention allows a client application to create and display windows that are always visible. Multiple always-visible windows may exist simultaneously without defeating the always-visible nature of the windows. The always-visible windows may also exist simultaneously with any number of normal windows. In this context, normal windows refers to all windows that are not always-visible windows. The general behavior of always-visible windows shall now be described with reference to FIGS. 2–8.

Window Behavior

According to the preferred embodiment of the invention, window behavior is governed by two simple rules. First, normal windows are never given higher positions in the stack order than always-visible windows. As a result, no portion of an always-visible window will ever be covered or obscured by a normal window. Second, always-visible windows are prevented from overlapping with each other. As a result, no portion of an always-visible window will ever be covered or obscured by any other always-visible window.

Figure 2:
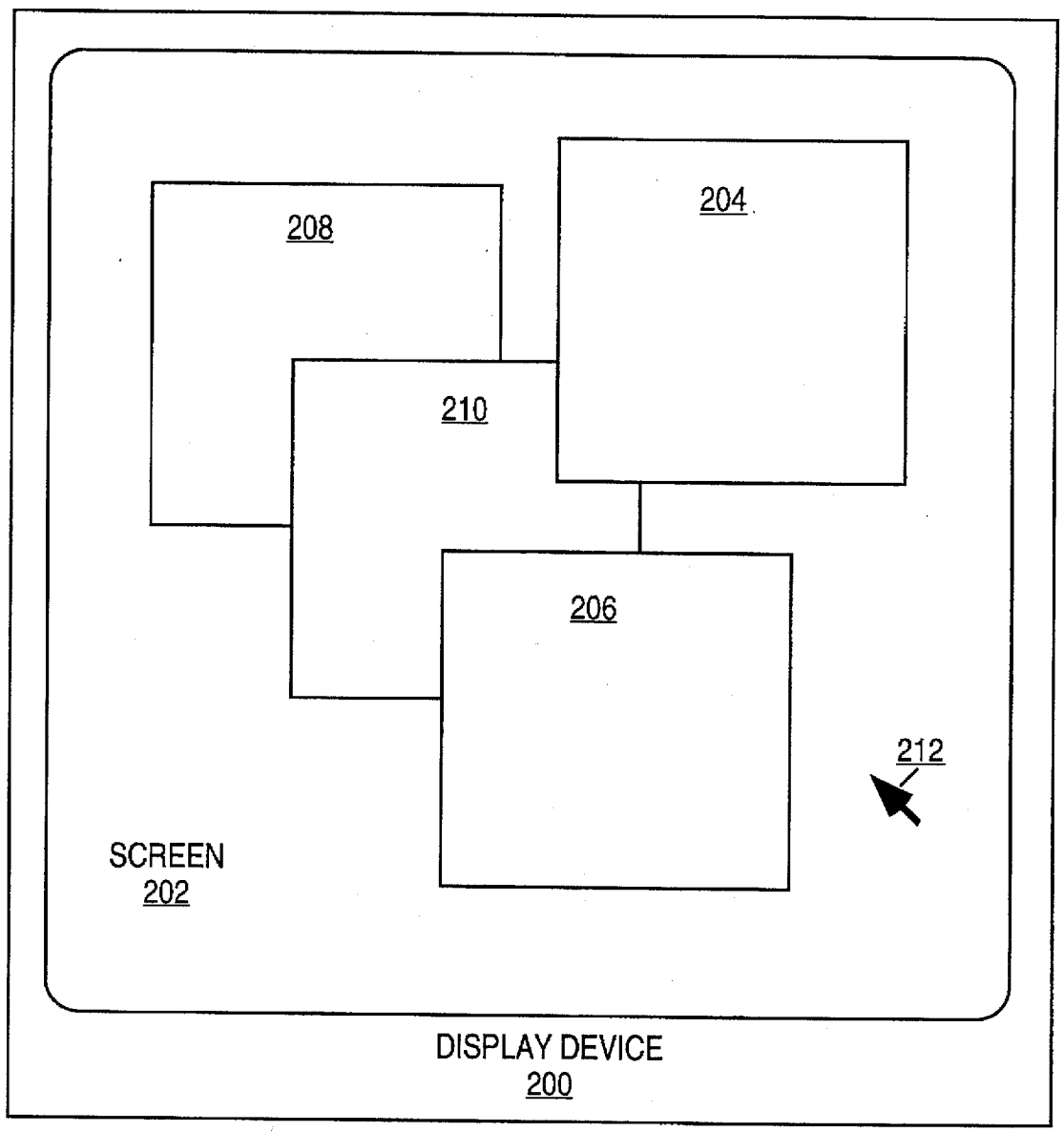
FIG. 2 illustrates a display device that is simultaneously displaying two always-visible windows and two normal windows on a screen according to an embodiment the invention.

These rules are illustrated in FIGS. 2–9. Referring to FIG. 2, it illustrates a display device 200 that is simultaneously displaying two always-visible windows 204 and 206 and two normal windows 208 and 210 on a screen 202. A visual indicator 212 is also shown on screen 202. Visual indicator 212 is used by a user to indicate a location on screen 202. Visual indicator 212 moves across screen 202 in response to user manipulation of a user input device, such as a mouse or trackball.

In the state of screen 202 illustrated in FIG. 2, window 210 overlaps with and covers a portion of window 208. Windows 204 and 206 overlap with and cover portions of window 210. No portions of windows 204 or 206 are covered by any other windows.

As mentioned above, when two windows overlap, the determination of which window will cover the other hinges on the current position of the windows in the stack order. The window that is higher in the stack order is displayed in the overlapping region, thereby covering the windows that are lower in the stack order. Consequently, the state of screen 202 in FIG. 2 indicates that window 210 is currently higher in the stack order than window 208, and that windows 204 and 206 are currently higher in the stack order than window 210.

Numerous window manipulation operations may cause two windows to overlap. For example, a window may be moved from one location on screen 202 to another location on screen 202. In addition, a window may be resized to cover a larger portion of screen 202. Other window manipulation operations change the stack order. When the stack order is changed in such a way as to place a window that is covered by another window higher in the stack order than the window that is covering it, the window is redrawn to cover the other window. In typical windowing systems, a window must be selected before it can be manipulated. The selection process may involve, for example, operating a user input device to position visual indicator 212 over a visual portion of a window, and performing a predefined user input operation (such as clicking a mouse button). In typical windowing systems, the selection of a window automatically places the window at the top of the stack order. However, as shall now be described with reference to FIGS. 3 through 8, the present invention modifies this standard windowing behavior to support always-visible windows.

Figure 3:
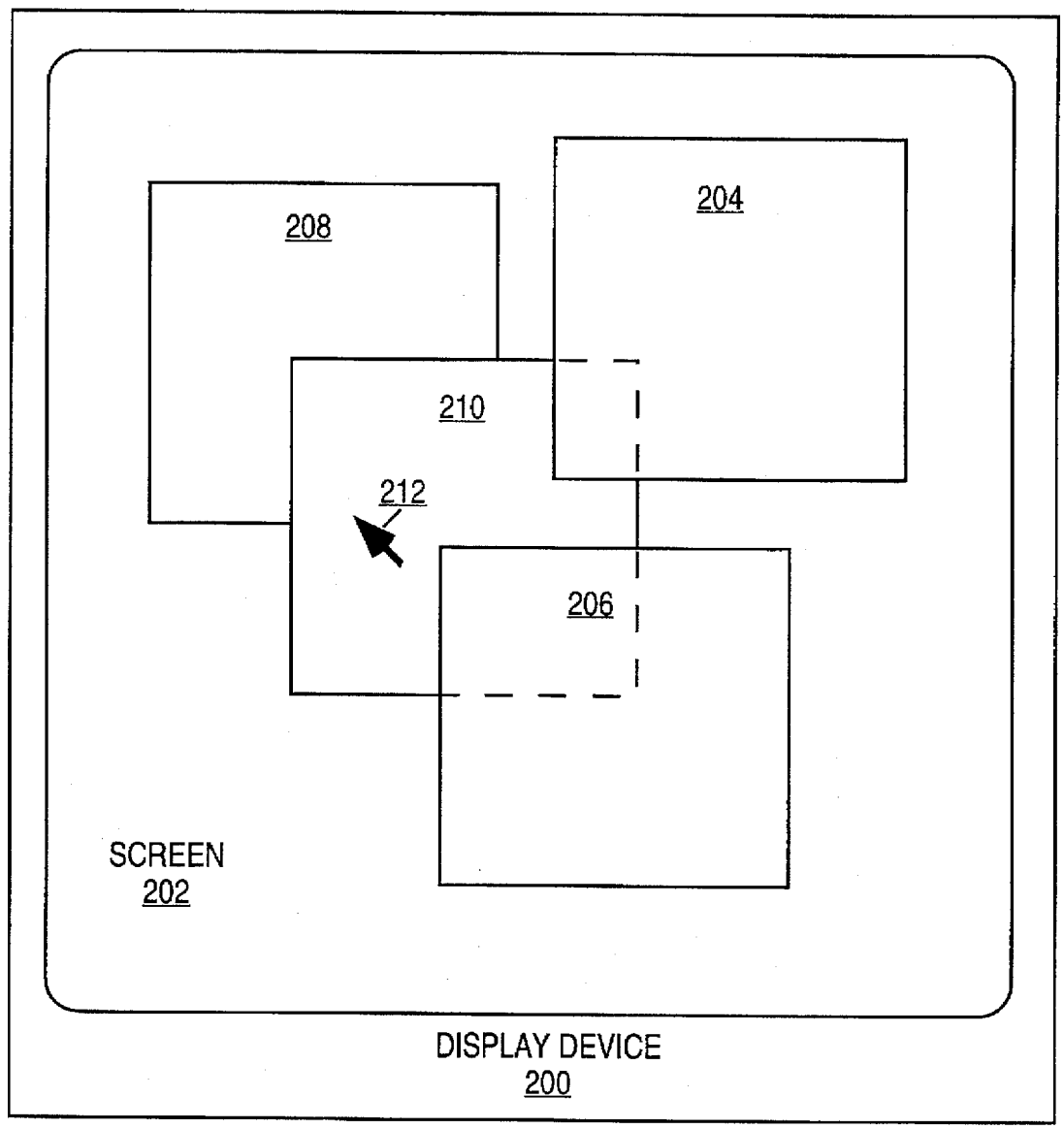
FIG. 3 illustrates the screen of FIG. 2 after a user has selected a normal window that overlaps with an always-visible window.

FIG. 3 illustrates screen 202 after a user has selected window 210. The borders of window 210 that are currently covered are illustrated with dashed lines. As mentioned above, in a typical windowing system, the selection of window 210 would cause window 210 to move to the highest position in the stack order. Therefore, window 219 would be redrawn to cover the portions of the other windows with which it overlaps. However, according to the present invention, a normal window such as window 210 is never moved to a higher position in the stack order than any currently existing always-visible window. Consequently, the selection of window 210 would not cause window 210 to move above windows 204 and 206 in the stack order. Therefore, after the selection of the window 210, screen 202 would still appear as illustrated in FIG. 2, with portions of windows 204 and 206 covering portions of window 210. Thus, the selection of a normal window that overlaps with one or more always-visible windows does not cause the normal window to be moved higher in the stack order than the always-visible windows.

Figure 4:
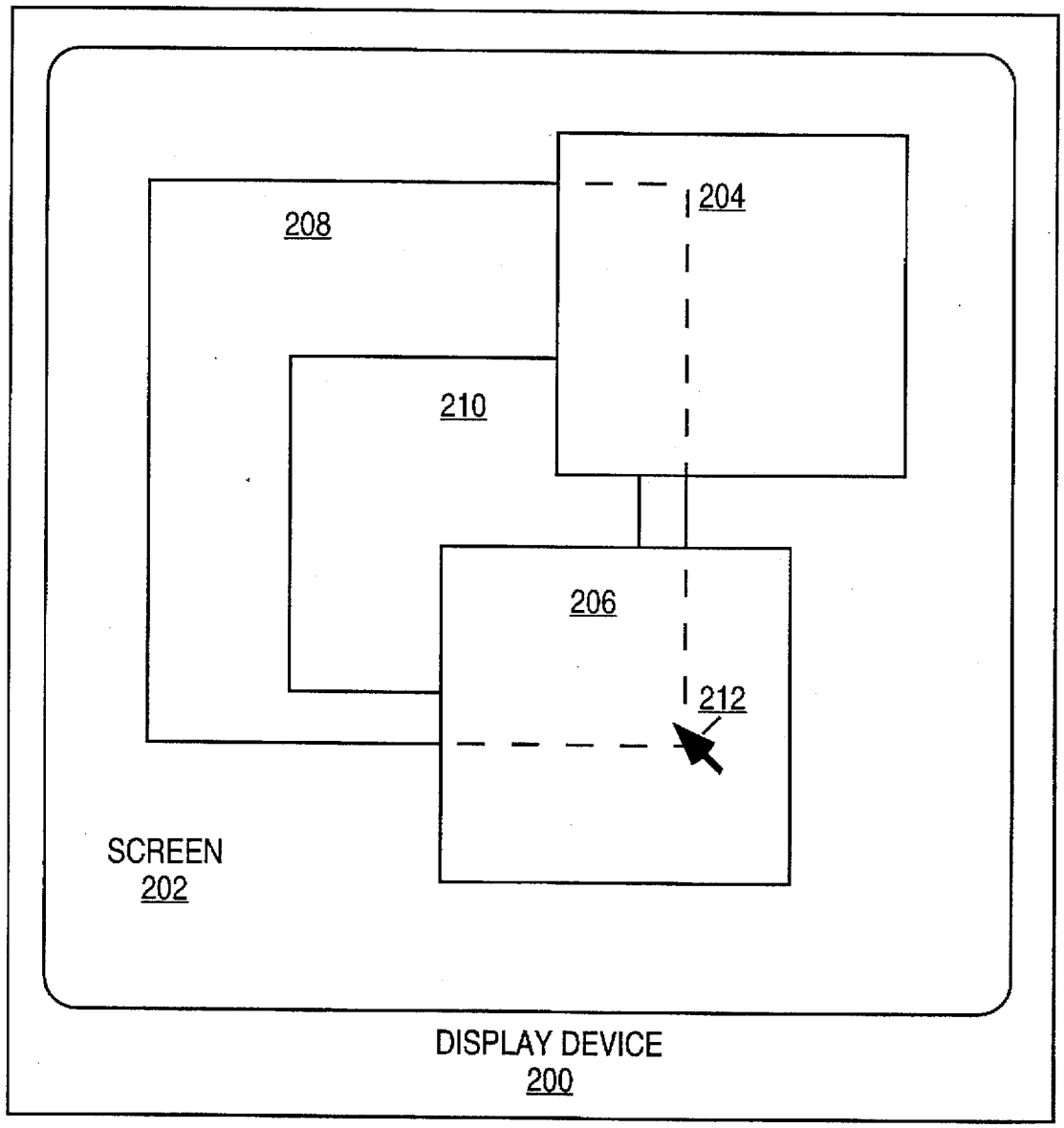
FIG. 4 illustrates the screen of FIG. 2 when the user is in the process of selecting and enlarging a normal window to cause the normal window to overlap with an always-visible window.
Figure 5:
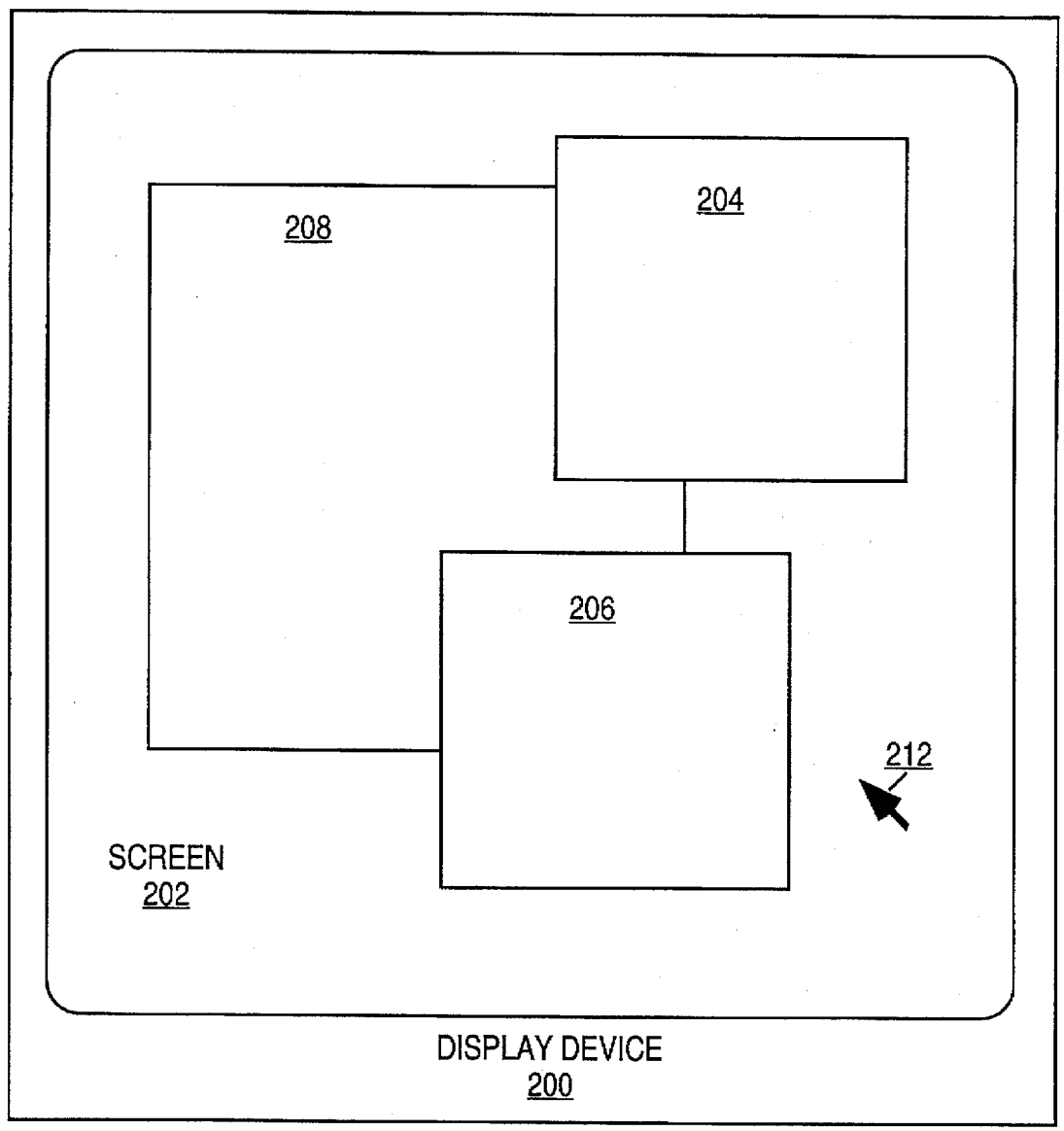
FIG. 5 illustrates the screen of FIG. 2 when the resize operation illustrated in FIG. 4 has completed.
Figure 6:
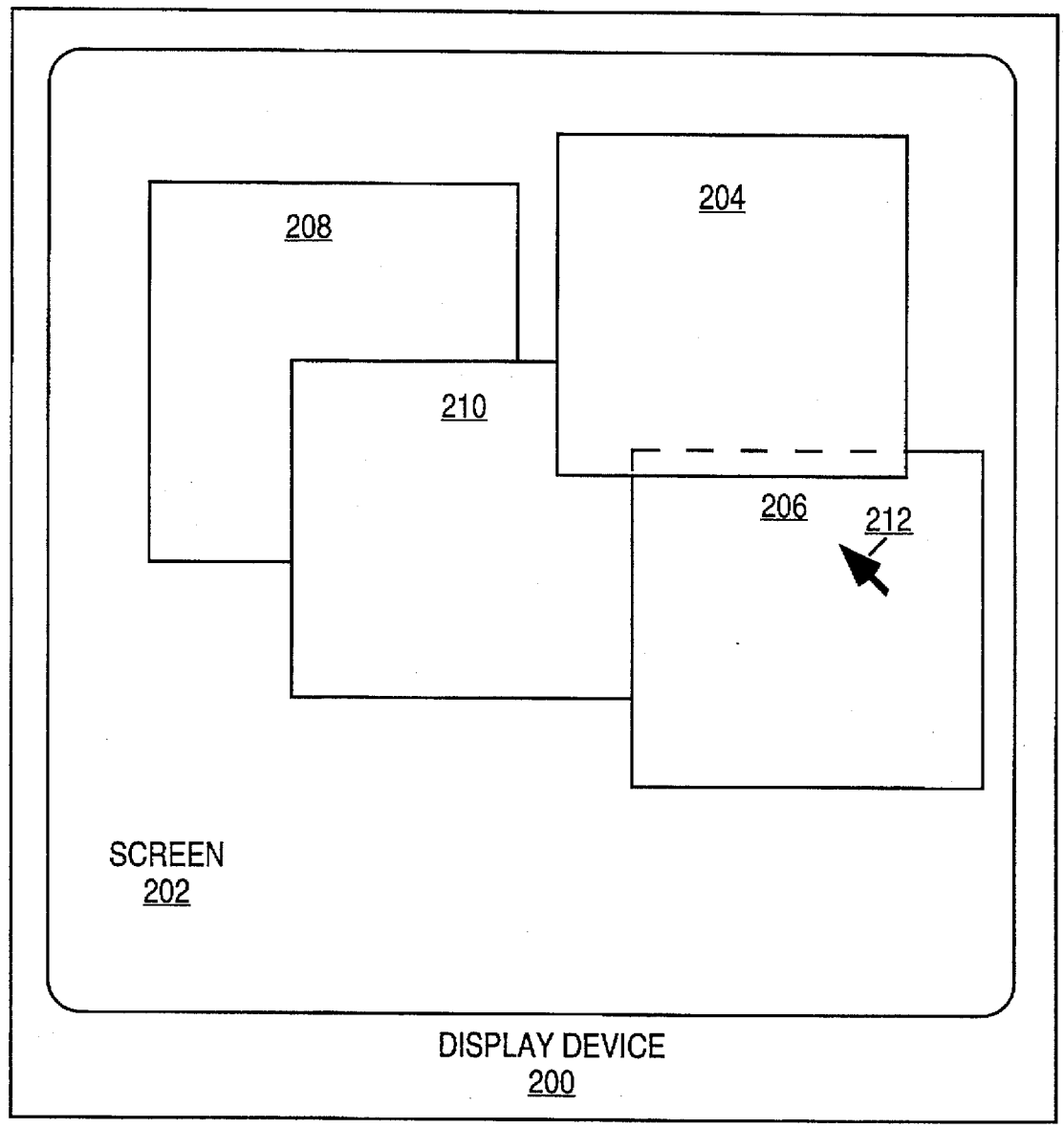
FIG. 6 illustrates the screen of FIG. 2 when a user has attempted to move an always-visible window into a new position that would cause the window to overlap with another always-visible window.
Figure 7:
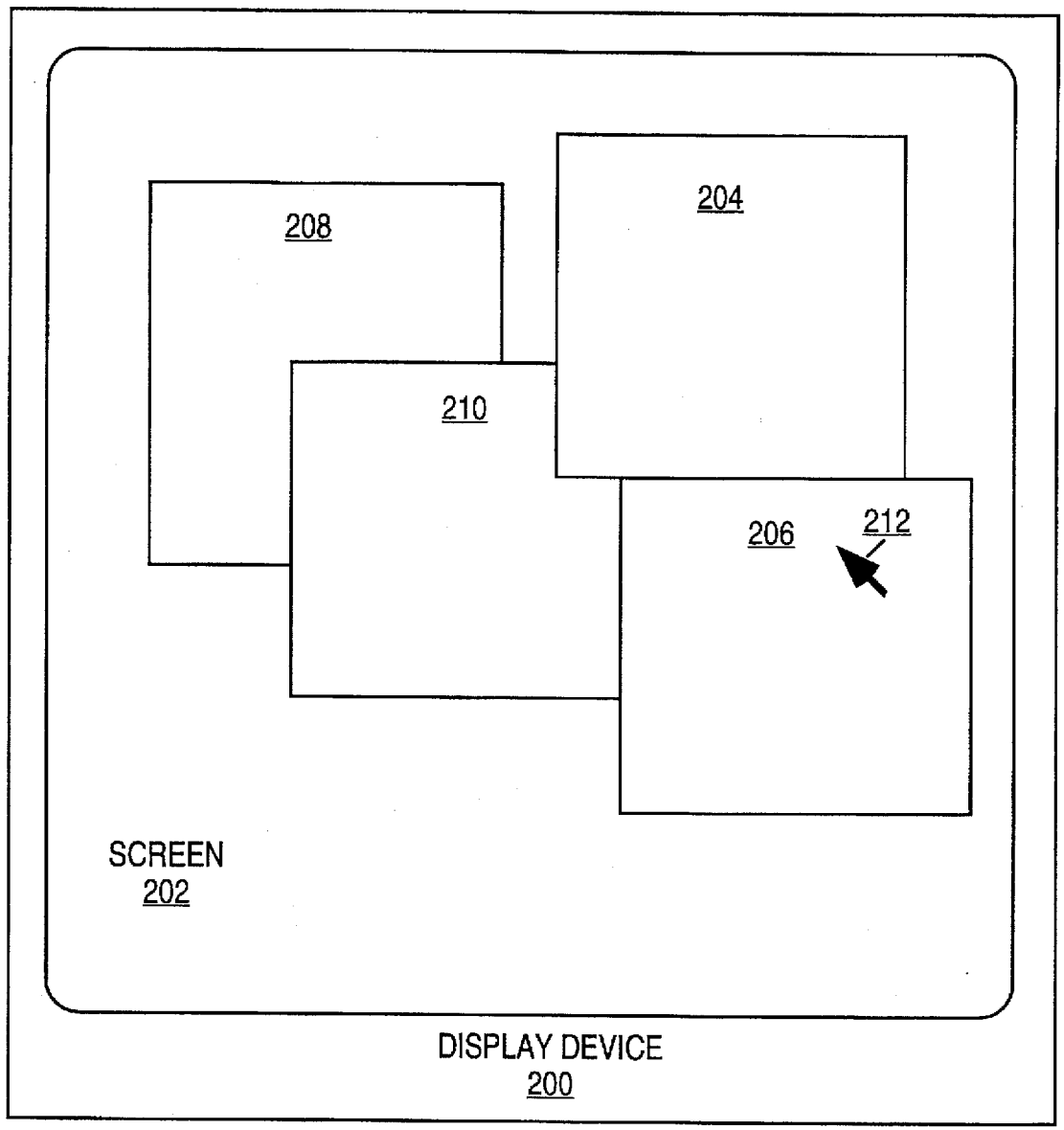
FIG. 7 illustrates the screen FIG. 2 after the operation shown in FIG. 6 showing how the window being moved is not allowed to overlap with another always-visible window.

Referring to FIG. 4, it illustrates a situation which a user has selected and enlarged window 208. Normally, the selection of 208 would cause window 208 to move to the highest position in the stack order. However, based on the window behavior rules implemented in the present invention, window 208 is placed in the highest position in the stack order relative to other normal windows, but remains lower in the stack order relative to all existing always-visible windows. Consequently, after window 208 has been resized as illustrated in FIG. 4, screen 202 would appear as illustrated in FIG. 5. Specifically, window 208 would be placed higher in the stack order than window 210, but still lower than windows 204 and 206. Thus windows 204 and 206 would still cover window 208, but window 208 would now cover window 210. FIG. 6 illustrates an attempt to cause two always-visible windows to overlap. Specifically, FIG. 6 illustrates the situation in which a user has attempted to move window 206 into a new position on screen 202 that would cause window 206 to overlap with window 204. As mentioned above, the present invention prevents two always-visible windows from overlapping. Consequently, rather than display window 206 in the position indicated by the user, the always-visible window that is being manipulated by the user is moved back to the closest non-overlapping previous position. The effect of this behavior is that two always-visible windows appear to bump into each other instead of overlapping. FIG. 7 illustrates the position of window 206 after the operation performed in FIG. 6. Specifically, window 206 is now adjacent to but does not overlap with window 204. It should be noted that the position of an always-visible window in the stack order is irrelevant with respect to other always-visible windows because always-visible windows are never allowed to overlap.

Figure 8:
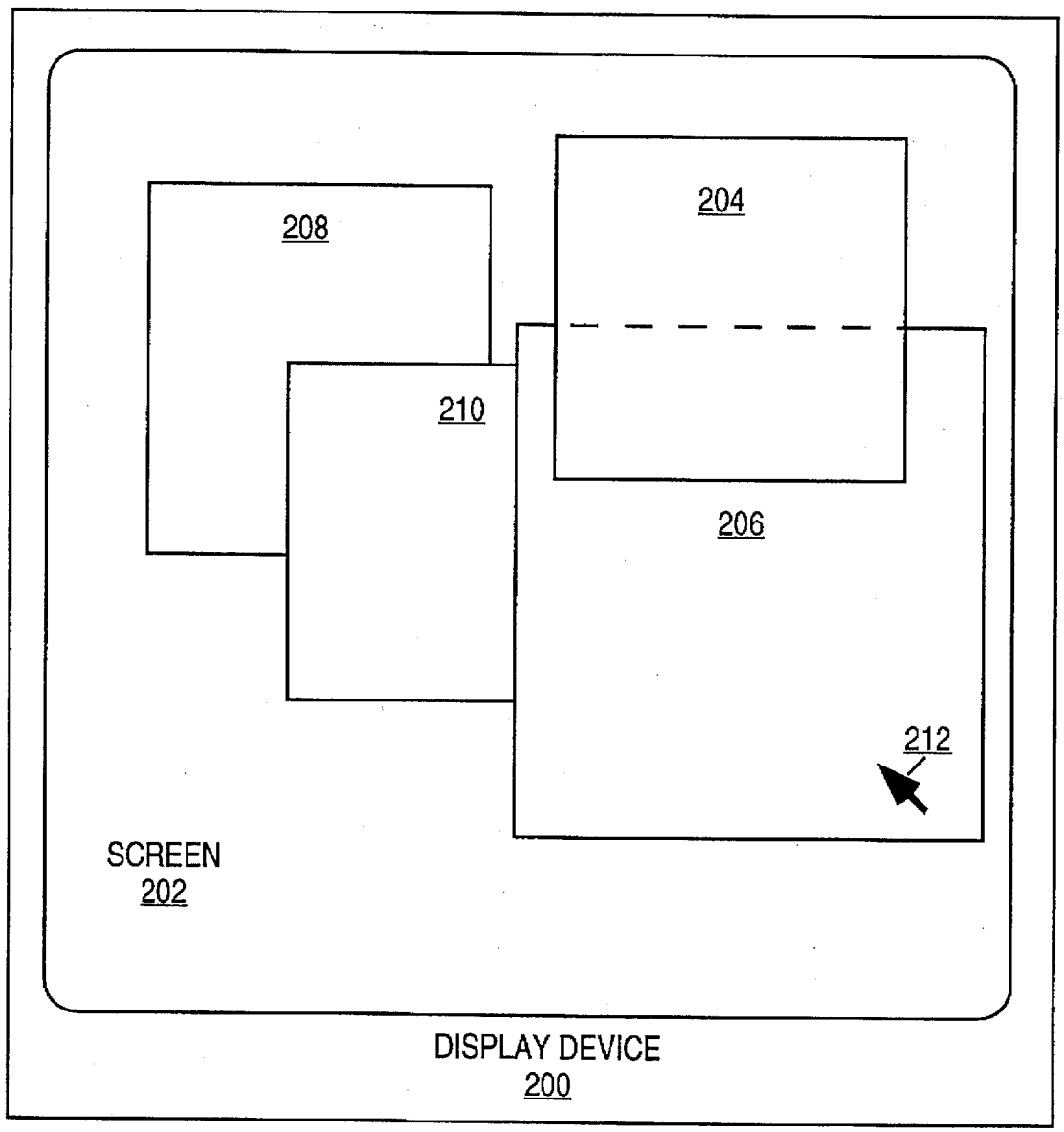
FIG. 8 illustrates the screen of FIG. 2 when a user attempts to resize an always-visible window in such a way as to cause the always-visible to overlap with another always-visible window.
Figure 9:
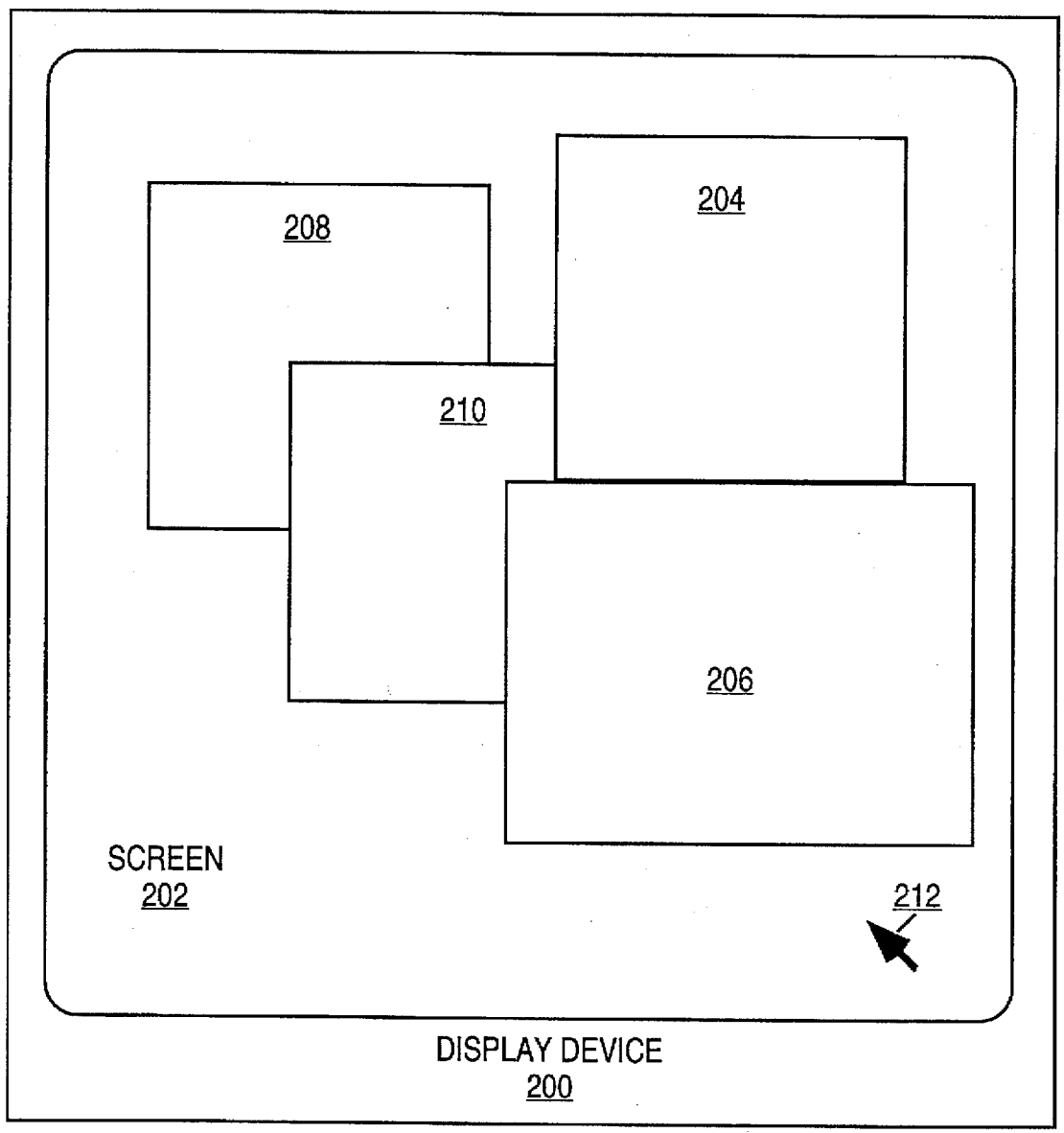
FIG. 9 illustrates the screen of FIG. 2 after the operation shown in FIG. 8.

FIG. 8 illustrates an attempt to resize an always-visible window in such a way as to cause the always-visible window to overlap with another always-visible window. Specifically, window 206 has been resized to overlap window 204. As in the previous example, the present invention responds by limiting the resize operation of window 206 to the closest non-overlapping previous position. This could result, for example, in the window positions illustrated in FIG. 9.

It should be noted that moving the always-visible window operated on back to the closest non-overlapping previous position is simply one of many possible techniques for implementing the present invention. For example, overlaps between always-visible windows may also be prevented by returning the operated-on always-visible window to its initial state after any operations which would otherwise cause the always-visible window to overlap with another always-visible window.

Alternatively, overlap between always-visible windows may be prevented by allowing the movement of one always-visible window to "push" other always-visible windows from their current positions. Thus, if a user attempted to move window 206 in FIG. 9 upward, window 204 would move upward along with it. Preferably, this upward repositioning of windows 204 and 206 would be halted as soon as window 204 reached the edge of screen 202. The "push" technique of preventing overlap between always-visible windows requires window management routines that are more complex than are required by other overlap-prevention techniques. This complexity is due to the fact that the movement of one always-visible window may require the movement of any number of other always-visible windows (e.g. window A pushes window B which pushes windows C and D, etc.). The present invention is not limited to any specific manner of implementing the window behavior rules described above.

General System Description

Figure 10:
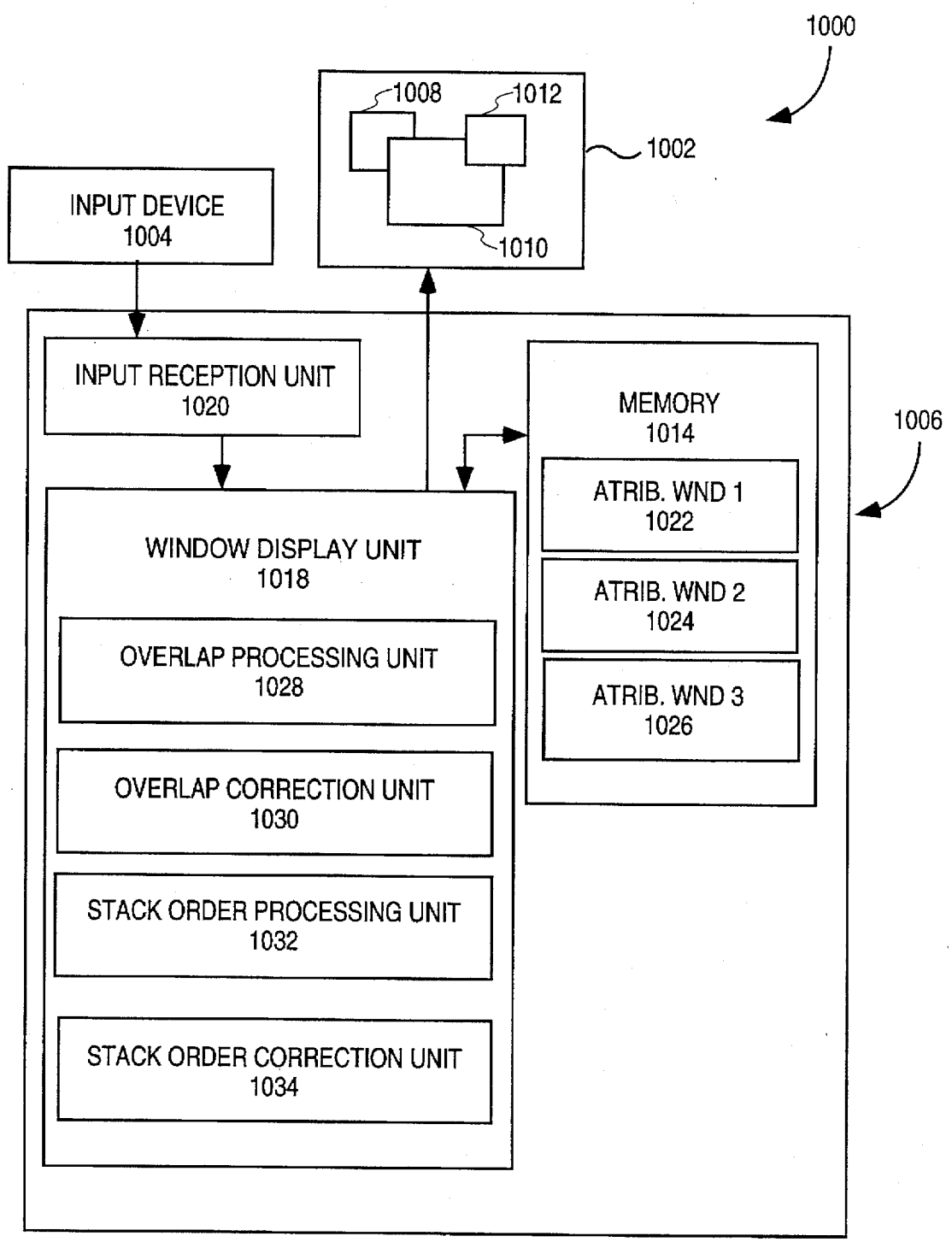
FIG. 10 illustrates a functional block diagram of a system that implements always-visible windows according to an embodiment of the invention.

FIG. 10 illustrates a functional block diagram of a computer system 1000 for implementing the window behavior described above. The computer system 1000 has a display device 1002, an input device 1004, and a window management system 1006. The window management system 1006 manages the windows displayed on display device 1002. In the illustrated example, three windows 1008, 1010 and 1012 are currently displayed on display device 1002.

The window management system 1006 generally includes a memory 1014, a window display unit 1018 and an input reception unit 1020. The memory 1014 contains a plurality of attributes 1022, 1024 and 1026 of the windows displayed on display device 1002. The attributes 1022, 1024 and 1026 that are stored in memory 1014 indicate for each window a stack order position, a screen position, a size (including vertical and horizontal dimensions) and whether the window is an always-visible window.

An "always-visible" attribute is not one of the normal window attributes defined and supported in the X-Windows specification. Consequently, a system which includes a separately-defined always-visible attribute would constitute an extension to the X-Windows system, rendering the system incompatible with other systems. Therefore, the always-visible attribute does not exist as a separately-defined window attribute in the preferred embodiment. Rather, attributes and/or properties that pre-exist in the X-Windows system are used to store the value of the always-visible attribute. According to one embodiment, the "override-redirect" attribute, which is defined in the X-Windows specification, is used as an "always-visible" flag. In an alternative embodiment, a list is attached as a property of a root window and used to identify always-visible windows. These embodiments shall be described in greater detail below.

FIG. 10 illustrates the embodiment in which the override-redirect attribute is used as an always-visible window flag. In the illustrated example, attributes 1022 include data indicating that window 1008 is not an always-visible window, and that window 1008 is third in the stack order. Attributes 1024 include data indicating that window 1010 is not an always-visible window, and that window 1010 is second in the stack order. Attributes 1026 include data indicating that window 1012 is an always-visible window and that window 1012 is first in the stack order. The window display unit 1018 causes display device 1002 to display the windows 1008, 1010 and 1012 based on the attributes 1022, 1024 and 1026 stored in memory 1014. If portions of two or more windows on display device 1002 share a common screen region, then the window display unit 1018 causes display device 1002 to display in the common screen region the portion of the window of the two or more windows that has a higher position in the stack order than the other windows. For example, windows 1008 and 1010 overlap. Because window 1010 is higher than window 1008 in the stack order, window 1010 is displayed in the overlap region.

The input reception unit 1020 is connected to the input device 1004 and receives input from a user. The input may be, for example, input that designates changes in the attributes stored in memory 1014. Window display unit 1018 includes a plurality of units for processing the attribute changes. Specifically, window display unit 1018 includes an overlap processing unit 1028, an overlap correction unit 1030, a stack order processing unit 1032 and a stack order correction unit 1034.

The overlap processing unit 1028 determines whether the changes cause two or more always-visible windows to overlap. The overlap correction unit 1030 alters the plurality of attributes 1022, 1024 and 1026 as needed to prevent overlap between always-visible windows. The stack order processing unit 1032 determines whether the changes cause an always-visible window to have a lower position in the stack-order than any window that is not an always-visible window. The stack order correction unit 1034 alters the attributes 1022, 1024 and 1026 as needed to prevent the always-visible window from having a lower position in the stack-order than any window that is not an always-visible window.

As described above, overlap processing unit 1028 and overlap correction unit 1030 cooperate to ensure that always-visible windows are never obscured by other always visible windows. Similarly, stack order processing unit 1032 and stack order correction unit 1034 cooperate to ensure that always-visible windows are never obscured by any window that is not an always-visible window. Consequently, always visible windows displayed on display device 1002 are never obscured by any other windows.

Client-based Implementation

As explained above, in the X-Windows system, window manager clients typically control the rules that govern user interface activity. All requests to affect the behavior or appearance of windows are first passed by the window manager through substructure redirection. Current window managers do not support the behavior of always-visible windows described above. Consequently, one embodiment of the present invention overrides substructure redirection for always-visible windows by setting the Substructure Override Redirect attribute of always-visible windows. Because the Substructure Override Redirect attribute is only set for always-visible windows, the value of the Substructure Override Redirect attribute also serves as a flag to distinguish always-visible windows from normal windows.

Once a client application that implements the present invention has identified the always-visible windows, as described above, the client maintains its own list of always-visible windows. The list contains information about each always-visible window, including the window ID, location and dimensions of the window.

The client then tracks all graphics events which may affect the visibility of the always-visible windows. If any graphic event would cause any portion of an always-visible window to become obscured, the client modifies the event to enforce the window behavior rules described above. Specifically, the client detects when a normal window is placed at the top of the stacking order and immediately transmits requests that cause all always-visible windows to be placed higher in the stack order than the normal window. The client also detects when an always-visible window is moved or resized. The new position and size is compared with all other always-visible windows. If the window movement or size change causes the always-visible window to overlap with one or more other always-visible windows, then the client transits a request to reposition or resize the always-visible window to the closest non-overlapping position.

Window Manager-based Implementation

Rather than implement the present invention in a client application that circumvents the window manager to implement always-visible windows, the present invention may be implemented in a window manager. Similar to the client implementation, the window manager would maintain a list of the always-visible windows and counteract events that would cause any portion of an always-visible window to become covered or obscured. However, to prevent other clients from performing operations that would obscure a portion of an always-visible window, a flag other than the Substructure Override Redirect would be used to identify always-visible windows. For example, a list of always-visible windows (an "always-visible window list") may be defined and created as a property attached to the root window.

Figure 11:
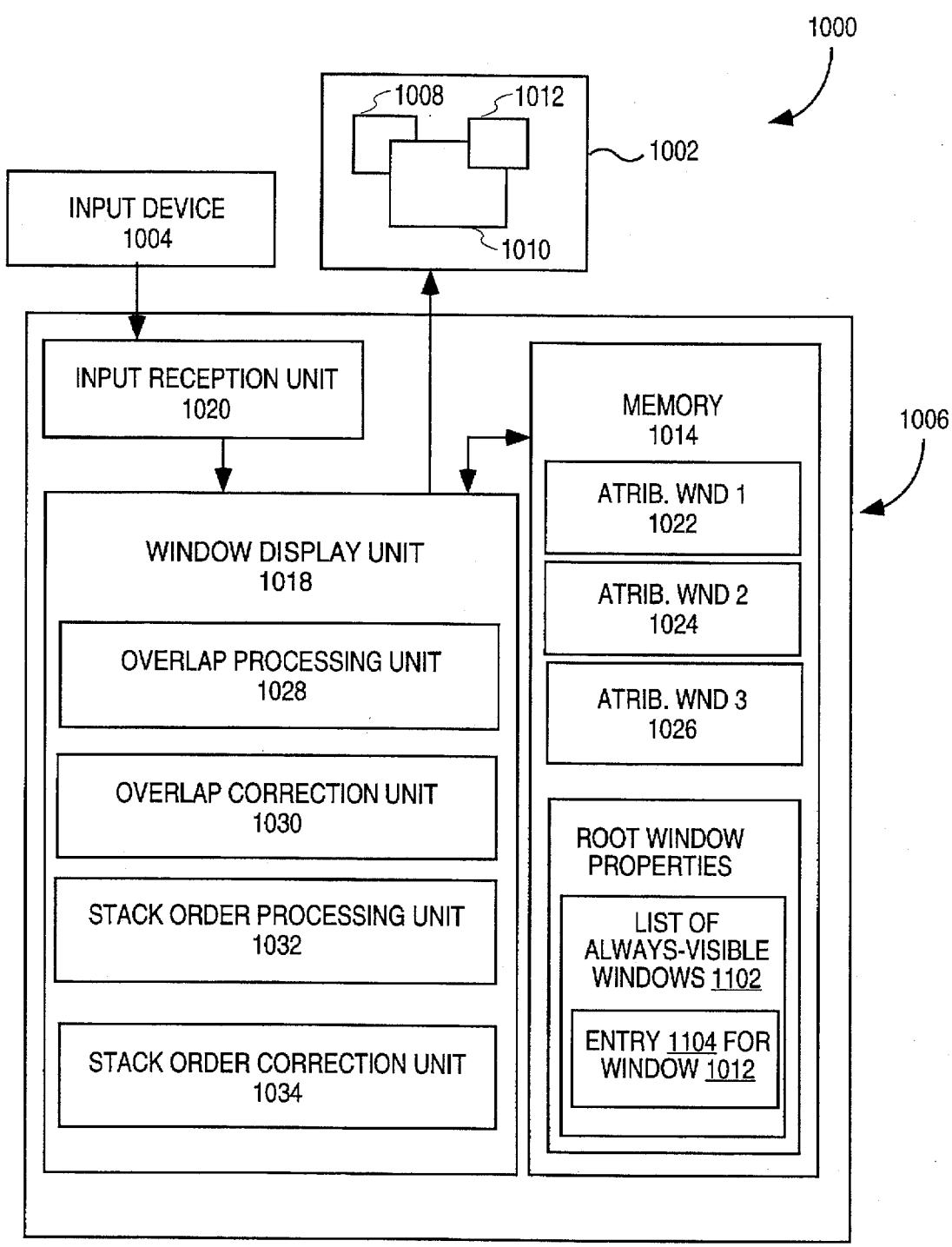
FIG. 11 illustrates a functional block diagram of a system that implements always-visible-windows according to an alternate embodiment of the invention.

Referring to FIG. 11, it illustrates an embodiment in which an always-visible window list 1102 is used to identify always-visible windows. The always-visible list 1102 includes a window identifier for each existing always-visible window. Specifically, always-visible window list 1102 includes an entry 1104 that corresponds to window 1012, which is the only always-visible window on display device 1002. During a resize window, select window or move window operation, window display unit 1018 accesses the always-visible windows list 1102 to determine whether particular windows are always-visible windows. Using an always-visible window list to identify always-visible windows allows joint control of always-visible windows by window display unit 1018 and a normal X system window manager.

X Client Application Operation

Figure 12A:
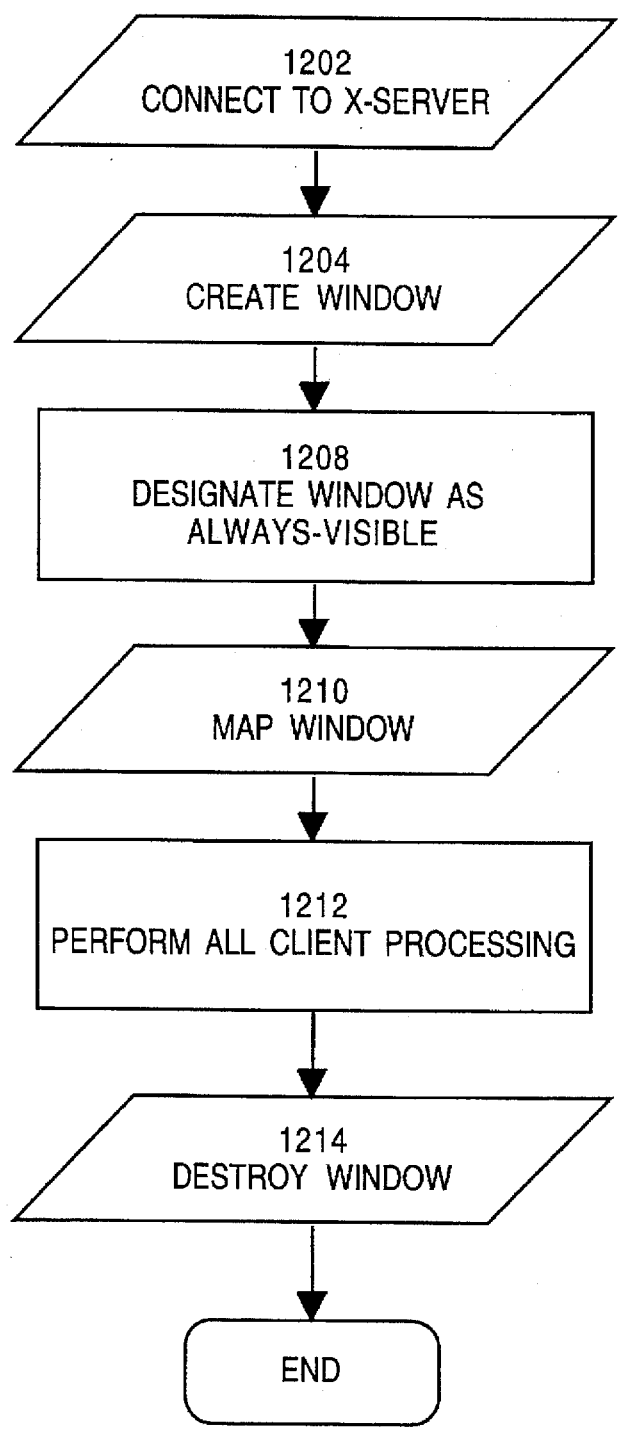
FIG. 12a illustrates the operation of an X Client according to an embodiment of the invention.
Figure 12B:
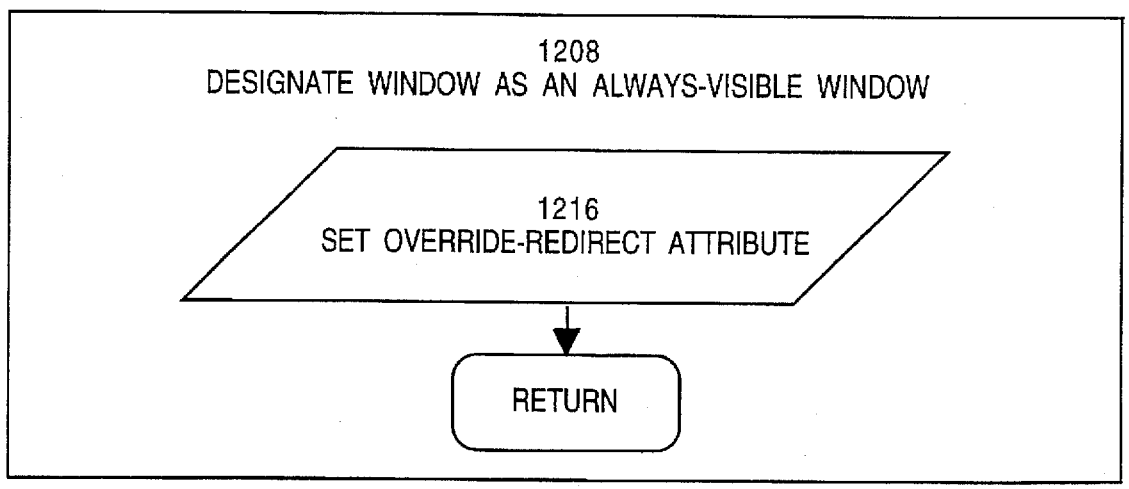
FIG. 12b illustrates steps for designating an always-visible window according to one embodiment of the invention.
Figure 12C:
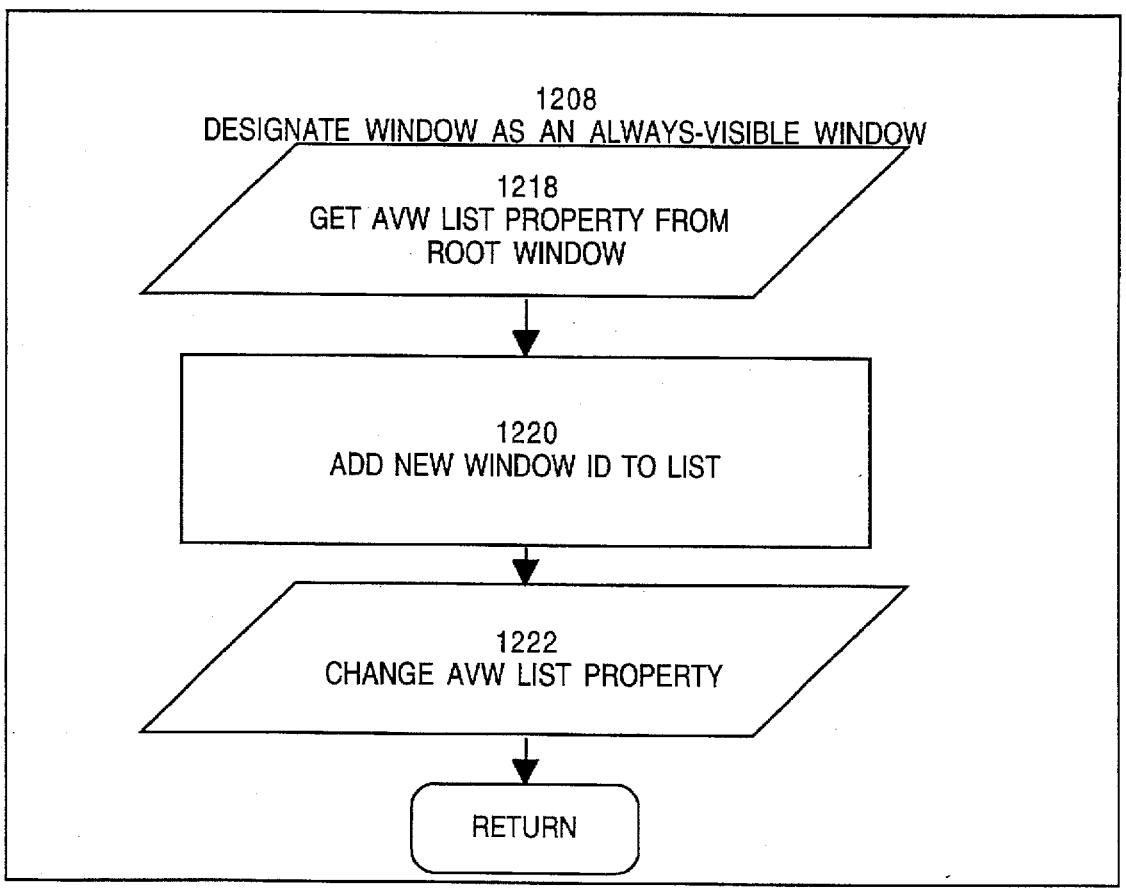
FIG. 12c illustrates steps for designating an always-visible window according to an alternative embodiment of the invention.

Referring to FIG. 12a, it is a flowchart illustrating the operation of an X Client application according to an embodiment of the invention. The X Client is designed to designate one or more windows as being "always visible". As discussed above, there are various possible methods for designating a window as an always-visible window. Reference to FIGS. 12b and 12c shall be made to describe two such methods. According to the first technique, all windows which have the "override redirect" attribute set are "always-visible" windows. According to the second technique, a list of window IDS for all always-visible windows is maintained in the form of a property attached to the root window. When this technique is used, each application which creates an always-visible window is responsible for adding the window ID to the always-visible window list at the time the window is created. A bump window manager, which will be described hereafter, removes the ID of an always-visible window from the always-visible window list automatically at the time that the always-visible window is destroyed.

Referring now to FIG. 12a, an X client connects to an X-Server at step 1202. The X Client connects to the X-Server by making an Xlib call that establishes a communications path between the X Client and a designated X-Server.

At step 1204, the X Client creates a window. At step 1208, the X Client designates that the window created in step 1204 is an always-visible window. As explained above, the window may be designated as an always-visible window according to one of any number of techniques. One technique is illustrated in FIG. 12b. According to this technique, the Override-Redirect Attribute of the window is set at step 1216.

An alternative technique for designating a window as an always-visible window is illustrated in FIG. 12c. According to the technique illustrated in FIG. 12c, the root window has a property which is defined as an always-visible windows list. At step 1218, the always-visible windows list property is retrieved. At step 1220 a window ID that corresponds to the newly created window is added as an entry into the always-visible windows list. At step 1222, the property of the root window that corresponds to the always-visible windows list is updated to reflect the revised always-visible windows list.

Referring again to FIG. 12a, the window is mapped at step 1210. Mapping the window causes the window to be displayed on the appropriate display. At step 1212, the client performs all client processing. This step generally represents the operation of the client. The steps actually performed during this step will vary based on the X Client and interaction between the X Client, the user, and other applications. During the X Client operation, various events may occur which affect the always-visible window. For example, other windows (both always-visible windows and non-always-visible windows) may be created, mapped, moved, resized and destroyed. When the X Client is through with all processing, the X Client destroys the window at step 1214.

Bump Window Manger Operation

According to one embodiment of the invention, a bump window manager is used to create the window behavior described above. A bump window manager may be a component of an X Windows manager or may coexist-exist separately from an X Windows manager. The purpose of the bump window manager is to identify and monitor windows which have been designated as always-visible windows. If the stacking order is changed, the bump window manager ensures that all always-visible windows are stacked above all other windows. If an always-visible window is moved or resized, then the bump window manager will check for overlapping conditions with other always-visible windows. If such an overlap condition occurs, then the bump window manager will issue a move or resize operation to place the always-visible window on which the operation was performed at a previous position or size which does not overlap any other always-visible window. The operation of the bump window manager will be described in greater detail with respect to FIGS. 13a, 13b, 13c, 13d and 13e.

Figure 13A:
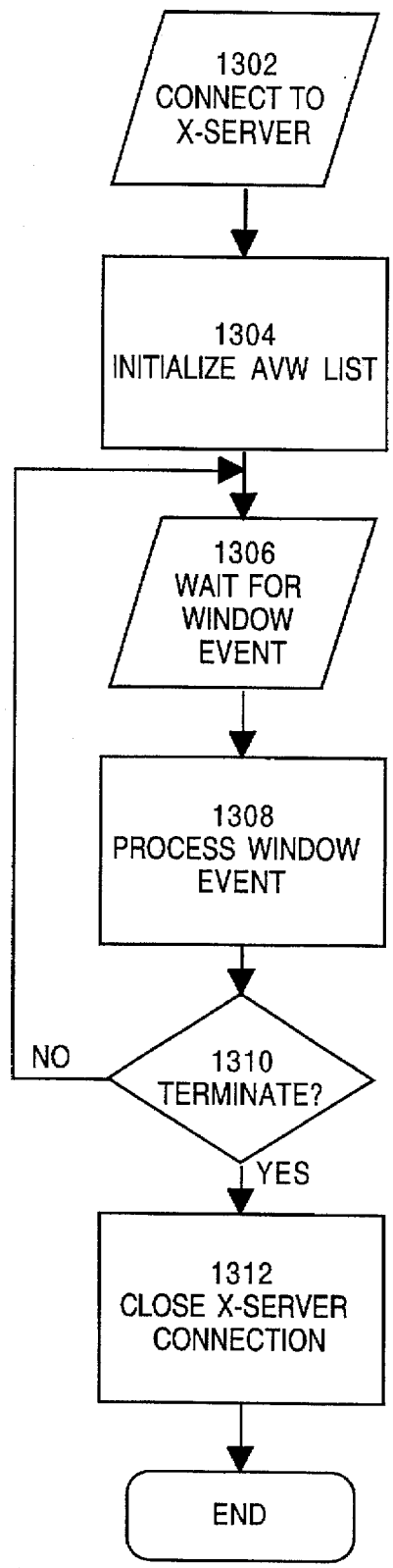
FIG. 13a illustrates the operation of a bump window manager according to an embodiment of the invention.

FIG. 13a is a flowchart illustrating the operation of a bump window manager. At step 1302, the bump window manager connects to the X-Server. This establishes a communication path between the bump window manager and a specified X-Server.

Figure 13B:
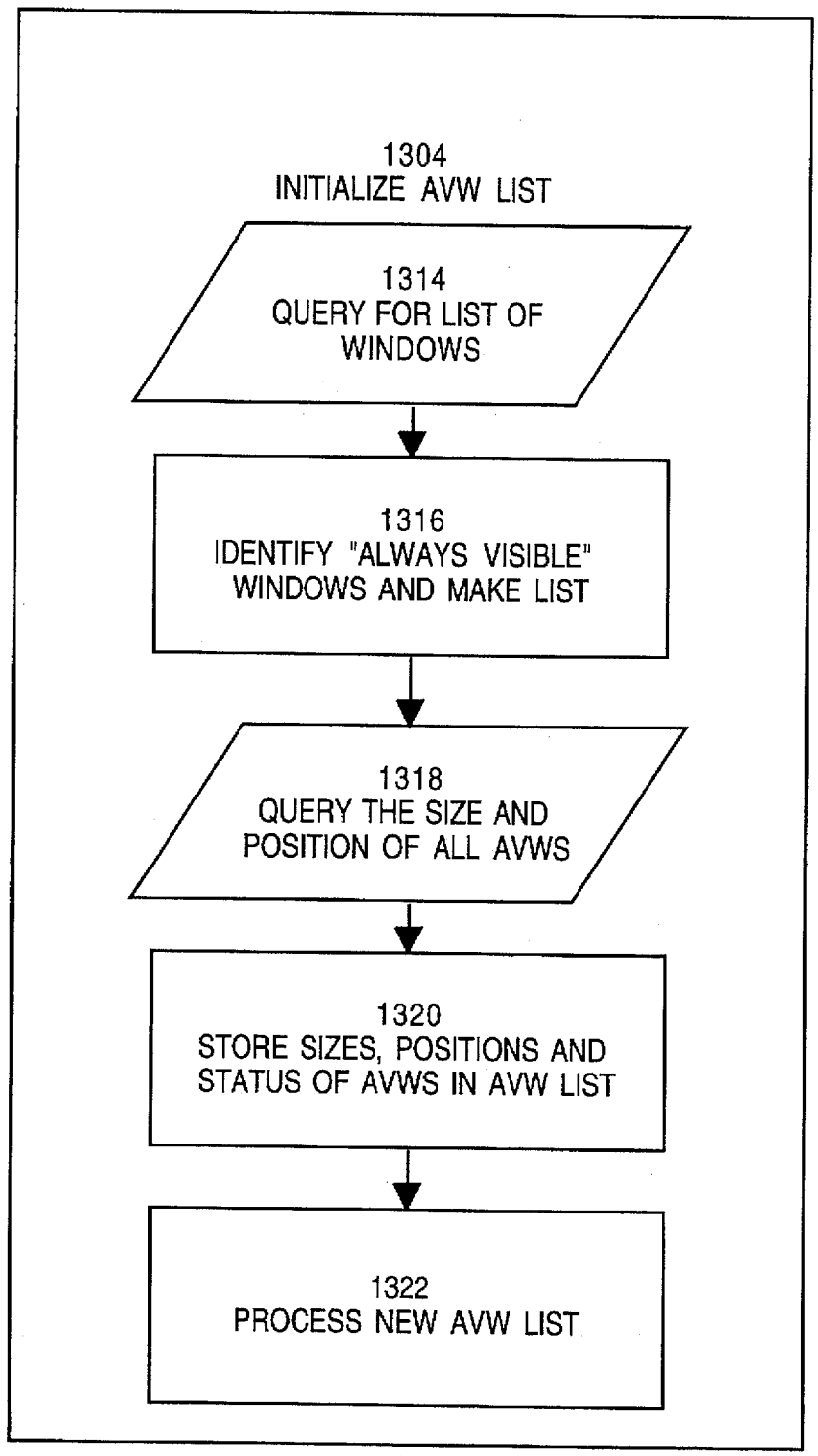
FIG. 13b illustrates the steps performed by the bump window manager to initialize an always-visible window list.

At step 1304, the bump window manager initializes an always-visible window list. Referring to FIG. 13b, it shows the steps performed by the bump window manager during step 1304 in greater detail. Specifically, at step 1314, the bump window manager queries the X-Server for a list of windows. At step 1316, the bump window manager identifies the always-visible windows in the list of windows and creates a list of the always-visible windows. Preferably, all always-visible windows are children of the root window.

The method used by the bump window manager to identify which of the windows identified by the X-Server are always-visible windows depends on the technique used to designate always-visible windows. For example, if the override-redirect attribute is used as a flag to designate always-visible windows, then the bump manager inspects the override-redirect attribute of all the windows identified by the X-Server. If a property attached to a root window is used to list the always-visible windows, then the bump window manager inspects the appropriate property of the root window.

At step 1318, the bump window manager queries the X-Server for the size and position of all of the always-visible windows. At step 1320, the bump window manager stores in an always-visible window list the sizes, positions, and window status of each of the always-visible windows. Consequently, the entry for each always-visible window in the always-visible window list includes the window ID, location, size, status (map/unmap) and stacking order of the always-visible window.

Figure 13C:
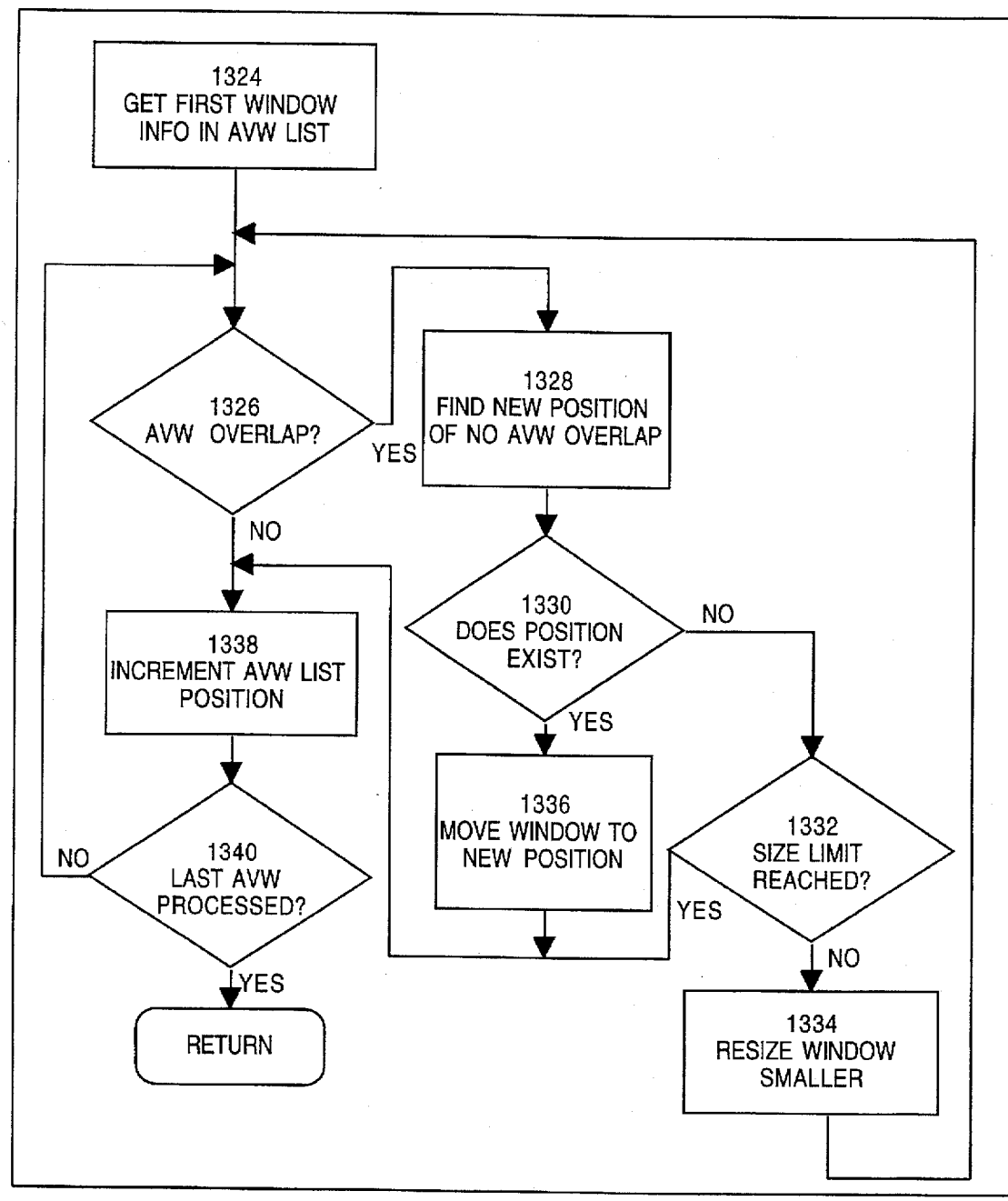
FIG. 13c illustrates the steps performed by the bump window manager to process the always-visible window list to avoid overlap between always-visible windows.

At step 1322, the bump window manager processes the new list. The operations performed by bump window manager to process the new always-visible window list are illustrated in FIG. 13c. Referring to FIG. 13c, steps 1326, 1338 and 1340 form a loop that is repeated until an overlap between mapped always-visible windows is encountered or until the entries for all of the always-visible windows have been processed. The information in an unmapped window cannot be obscured by another window because the information it is not even displayed. Therefore, in the preferred embodiment, overlap between an unmapped always-visible window and any other always-visible window is ignored.

When an overlap is encountered between a particular mapped always-visible window and one or more other mapped always-visible windows, then control passes from step 1326 to step 1328. At step 1328, the bump window manager determines a new position for the particular always-visible window which avoids overlap between the always-visible window and all other mapped always-visible windows. At step 1330, it is determined whether such a position exists. If such a position exists, then the always-visible window is moved to the position at step 1336. If such a position does not exist, then control passes to step 1332.

At step 1332, the bump window manager determines whether the size limit of the always-visible window has been reached. In this context, the size limit is the minimum size that the always-visible window is allowed to assume. If the size limit for the always-visible window has been reached, then control passes to step 1338 and the next always-visible window entry in the list is processed. If the size limit for the always-visible window has not been reached, then the size of the always-visible window is reduced. Steps 1326, 1328, 1330, 1332 and 1334 form a loop such that the size of an always-visible window will be reduced until either the window can be moved to a non-overlapping position or its size limit has been reached.

Referring again to FIG. 13a, when the always-visible window list has been initialized, the bump window manager waits for a window event (step 1306). When a window event occurs, control passes to step 1308 where the window event is window event occurs, control passes to step 1308 where the window event is processed. Step 1308 shall be described in greater detail with reference to FIGS. 13d and 13e.

Figure 13D:
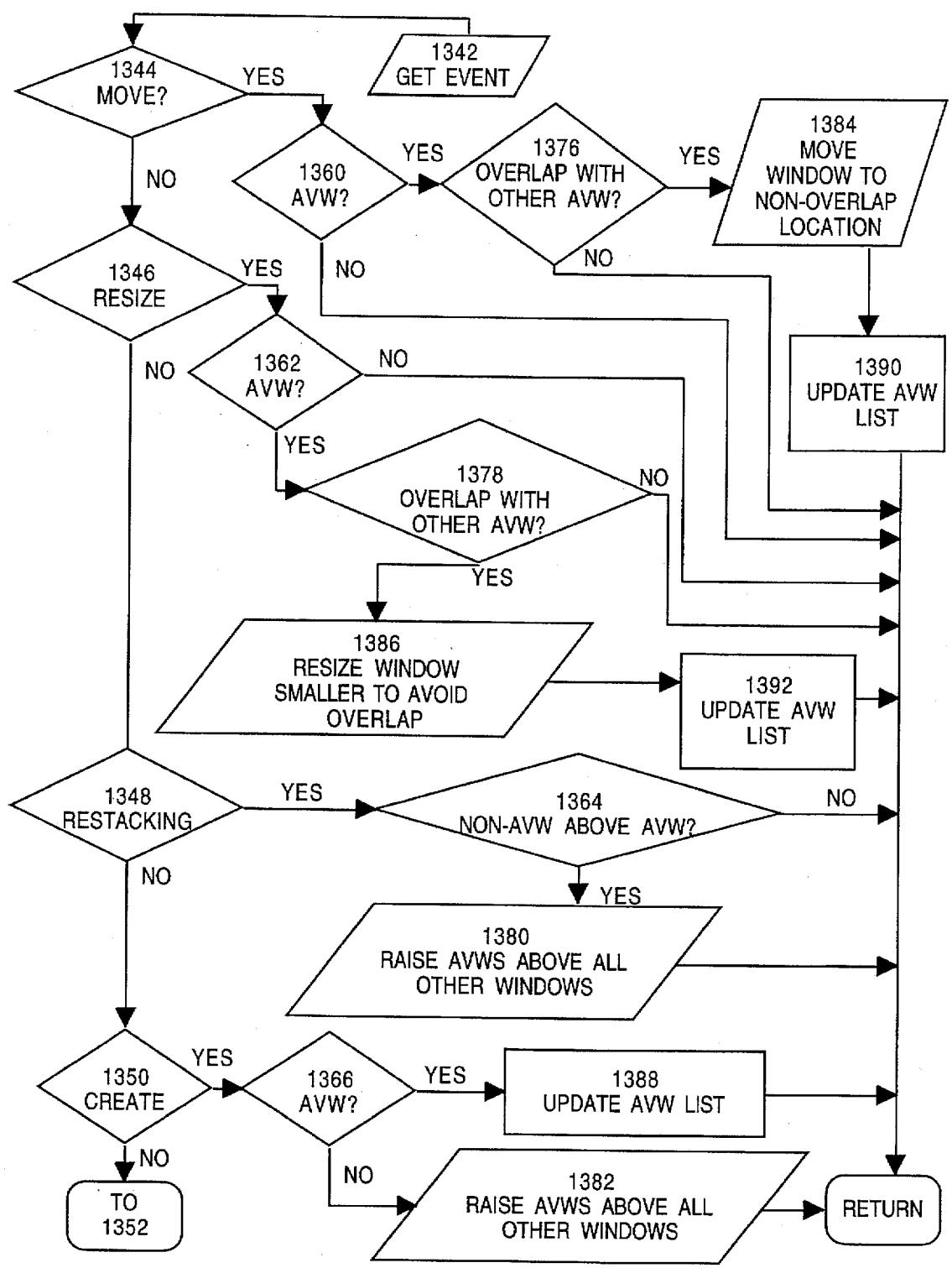
FIG. 13d illustrates the steps performed by the bump window manager in response to detection of an event which affects a window.
Figure 13E:
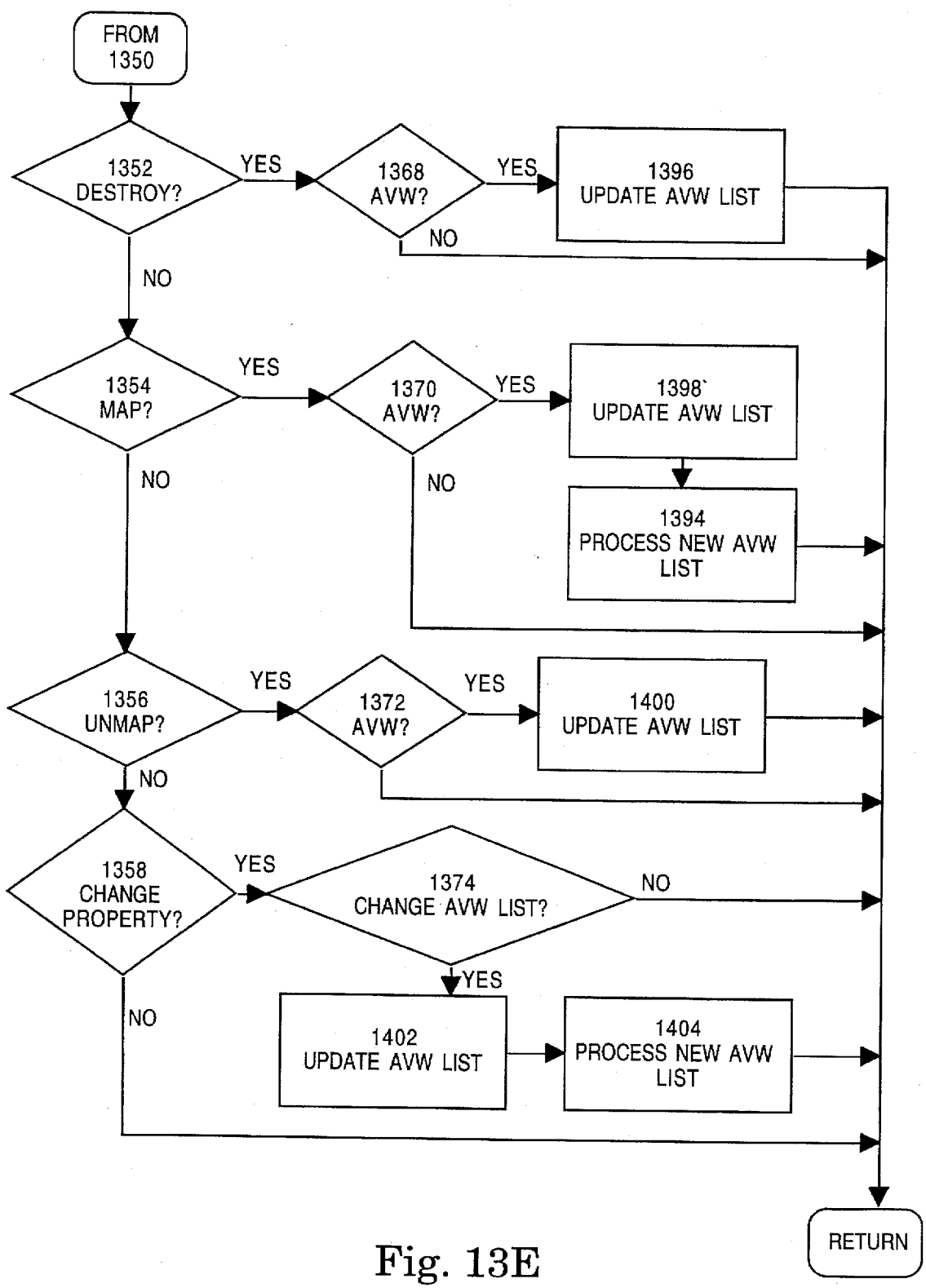
FIG. 13e is a continuation of the flow chart illustrated in FIG. 13d.

Referring to FIG. 13d and 13e, they illustrate a flowchart of the steps performed by the bump window manager when a window event takes place. At step 1342 the bump window manager receives data that identifies the event that has occurred. At steps 1344 to 1358, the bump window manager identifies the type of event which has occurred.

If the event specifies that a particular window is to be moved, then control passes from step 1344 to step 1360. At step 1360, the bump window manager determines whether the window on which the operation is to be performed is an always-visible window. If the window is not an always-visible window, then the bump window manager need not perform any further processing in response to the window event. If the window is an always-visible window, then control passes to step 1376. At step 1376, the bump window manager determines whether the move will cause the always-visible window to overlap with another always-visible window. If not, then the bump window manager need not perform any further processing in response to the window event. Otherwise, the always-visible window is moved to a non-overlap location in step 1384. The non-overlap location may be, for example, adjacent to but not overlapping with the other always-visible window. At step 1390, the entry in the always-visible window list that corresponds to the window that was moved is updated to reflect the new location of the window that was moved.

If the event specifies that a particular window is to be resized, then control passes from step 1346 to step 1362. At step 1362, the bump window manager determines whether the window on which the operation is to be performed is an always-visible window. If the window is not an always-visible window, then the bump window manager need not perform any further processing in response to the window event. If the window is an always-visible window, then control passes to step 1378. At step 1378, the bump window manager determines whether the resize operation will cause the always-visible window to overlap with another always-visible window. If not, then the bump window manager need not perform any further processing in response to the window event. Otherwise, the always-visible window is resized to a size in which the always-visible window does not overlap with any other always-visible window in step 1386. The new size of the window will be smaller than the size specified in the resize event. For example, the size may be a size which causes the border of the resized window to be adjacent to but not overlapping with the border of the other always-visible window. At step 1392, the entry in the always-visible window list that corresponds to the window that was resized is updated to reflect the new size of the window that was resized.

If the event specifies a change in the stacking order, then control passes from step 1348 to step 1364. At step 1364, the bump window manager determines whether any non-always-visible window is above any always-visible window in the new stacking order. If no non-always-visible window is above any always-visible window in the new stacking order, then the bump window manager need not perform any further processing in response to the window event. If any non-always-visible window is above any always-visible window in the new stacking order, then control passes to step 1380. At step 1380, the bump window manager adjusts the new stacking order to ensure that all always-visible windows are above all non-always-visible windows in the stacking order.

If the event specifies that a particular window is to be created, then control passes from step 1350 to step 1366. At step 1366, the bump window manager determines whether the newly created window is an always-visible window. If the window is not an always-visible window, then at step 1382 the bump window manager adjusts the stacking order to ensure that all always-visible windows are above all non-always-visible windows in the stacking order. If the window is an always-visible window, then control passes to step 1388. At step 1388 an entry is added to the always-visible window list for the newly created always-visible window.

If the event specifies that a particular window is to be destroyed, then control passes from step 1352 to step 1368. At step 1368, the bump window manager determines whether the window on which the operation is to be performed is an always-visible window. If the window is not an always-visible window, then the bump window manager need not perform any further processing in response to the window event. If the window is an always-visible window, then control passes to step 1396. At step 1396, the always-visible window list is updated. Specifically, the entry for the always-visible window that is to be destroyed is removed from the always-visible window list.

If the event specifies that a particular window is to be mapped, then control passes from step 1354 to step 1370. At step 1370, the bump window manager determines whether the window on which the operation is to be performed is an always-visible window. If the window is not an always-visible window, then the bump window manager need not perform any further processing in response to the window event. If the window is an always-visible window, then control passes to step 1398. At step 1398, the always-visible window list is updated. Specifically, the map/unmap status in the entry for the always-visible window is revised to reflect that the always-visible window is mapped. Once the entry has been revised, the always-visible window list is processed at step 1394 to ensure that no mapped always-visible windows overlap with any other mapped always-visible windows. The steps involved in processing the always-visible window list are described above with reference to FIG. 13c.

If the event specifies that a particular window is to be unmapped, then control passes from step 1356 to step 1372. At step 1372, the bump window manager determines whether the window on which the operation is to be performed is an always-visible window. If the window is not an always-visible window, then the bump window manager need not perform any further processing in response to the window event. If the window is an always-visible window, then control passes to step 1400. At step 1400, the always-visible window list is updated. Specifically, the map/unmap status in the entry for the always-visible window is revised to reflect that the always-visible window is no longer mapped.

If the event specifies that a property of a particular window is to be changed, then control passes from step 1358 to step 1374. At step 1374, the bump window manager determines whether the property to be changed is an always-visible window list. If the property to be changed is not an always-visible window list, then the bump window manager need not perform any further processing in response to the window event. If the property to be changed is an always-visible window list, then control passes to step 1402. At step 1402 the always-visible window list is revised as specified in the event. Once the always-visible window list has been revised, the always-visible window list is processed at step 1404 to ensure that no mapped always-visible windows overlap with any other mapped always-visible windows. The steps involved in processing the always-visible window list are described above with reference to FIG. 13c.

Referring again to FIG. 13a, steps 1306, 1308 and 1310 define a loop in which window events are processed as described above until a condition occurs which causes the bump window manager to terminate. Upon the occurrence of such a condition, control passes from step 1310 to step 1312. At step 1312, the bump window manager closes the connection that has been established between the bump window manager and the X-Server.

Transparent Backgrounds

According to another aspect of the invention, it is desirable to provide always-visible windows that have a transparent background. A transparent background allows a user to see the screen regions that are covered by the window. Only the foreground data within the window is not transparent. By providing always-visible windows with transparent backgrounds, one can ensure that certain data will always be visible and yet minimize the amount of information that is obscured by the always-visible window.

Possible Applications

The always-visible windows provided by the present invention are ideal for use in any computer application that requires the constant display of critical information. For example, in air traffic control certain data pertaining to aircraft must not be covered by any other information. Previously, this constraint did not allow air traffic control applications to take advantage of windows-based environments. However, by displaying the critical data in always-visible windows, air traffic control applications can take advantage of the convenience provided by windows-based graphical environments. Air traffic control is just one example of a field which would benefit significantly from the present invention. However, the present invention is not limited to any specific field of use.

While specific embodiments of the present invention have been described, various modifications and substitutions will become apparent by this disclosure. Such modifications and substitutions are within the scope of the present invention, and are intended to be covered by the following claims.

What is claimed is:

1. A method for displaying information on a display device of a computer system, the method comprising the steps of:

simultaneously displaying information in a plurality of windows on said display device, wherein said plurality of windows includes a first always-visible window;

maintaining a plurality of configurations that correspond to said plurality of windows, wherein the configuration for each of said plurality of windows reflects a location and dimensions of the window on the display device;

detecting an event that causes a portion of a second window of said plurality of windows to occupy a common region on said display device with a portion of said first always-visible window;

determining whether said second window is an always-visible window;

if said second window is an always-visible window, then altering either the configuration of the first always-visible window or the configuration of the second window, or the configurations of both said first always-visible window and second window, so that no portion of said second window occupies a common region on said display device with any portion of said first always-visible window.

2. The method of claim 1 further comprising the step of:

if said second window is not an always-visible window, then displaying said portion of said first window in said common region.

3. The method of claim 1 wherein:

said first window has a transparent background;

said step of displaying said portion of said first window in said common region includes the steps of displaying in said common region information from said first window, and displaying in said common region information from a non-transparent window that overlaps with said first window.

4. The method of claim 1 further comprising the steps of:

maintaining a stack order for said plurality of windows, wherein each window of said plurality of windows has a position in said stack order;, receiving user input to cause said second window to have a higher position in said stack order than said first always-visible window;

if said second window is not an always-visible window, then altering said stack order to cause said first always-visible window to have a higher position in said stack order than said second window.

5. The method of claim 1 wherein each of said plurality of windows includes an override-redirect attribute, wherein said step of determining whether said second window is an always visible window includes the step of determining whether the override-redirect attribute is set.

6. The method of claim 1 wherein:

said plurality of windows include a root window;

said root window has a property that is defined as an always-visible window list;

said always-visible window list includes an entry for each of said plurality of windows that is an always-visible window; and said step of determining whether said second window is an always visible window includes inspecting said always-visible window list to determine whether said always-visible window list includes an entry for said second window.

7. The method of claim 6 further comprising the steps of:

detecting an event that destroys said first always-visible window; and removing an entry that corresponds to said first always-visible window from said always-visible window list.

8. The method of claim 6 further comprising the steps of:

detecting an event that creates a new always-visible window;

the method further comprising adding an entry that corresponds to said new always-visible window to said always-visible window list;

determining whether said new always-visible window overlaps with any other always-visible window; and if said new always-visible window overlaps with any other always-visible window, then altering either the configuration of the new always-visible window or the configuration of the other always-visible window, or the configurations of both said new always-visible window and the other always-visible window, so that no portion of said new always-visible window overlaps said other always-visible window.

9. A window management system for use on a computer system that has a display device, the window management system comprising:

a memory that contains a plurality of attributes of a plurality of windows, wherein said plurality of attributes indicate whether each window of said plurality of windows is an always-visible window, wherein said plurality of attributes indicate a stack order position for each window of said plurality of windows;

an input reception unit for receiving input from a user, said input designating changes in said plurality of attributes;

a window display unit for displaying said plurality of windows on said display device based on said plurality of attributes;

wherein if portions of two or more windows of said plurality of windows share a common screen region, then the window display unit displays in said common screen region the portion of the window of said two or more windows that has a higher position in said stack order than the other of said two or more windows;

wherein the window display unit includes an overlap processing unit for determining whether said changes cause two or more always-visible windows to overlap; and an overlap correction unit for altering said plurality of attributes to prevent overlap between said two or more always-visible windows;

a stack order processing unit for determining whether said changes cause an always-visible window to have a lower position in said stack-order than any window that is not an always-visible window; and a stack order correction unit for altering said plurality of attributes to prevent said always-visible window from having a lower position in said stack-order than any window that is not an always-visible window.

10. The window management system of claim 9 further including a mechanism for maintaining a record of which of said plurality of windows are always-visible windows.

11. The window management system of claim 10 wherein:

said plurality of attributes include an override redirect attribute; and said mechanism maintains said record by setting the override redirect attribute of each of said plurality of windows to reflect whether said window is an always-visible window.

12. The window management system of claim 10 wherein:

said plurality of windows include a root window;

said root window has a property defined as an always-visible window list;

said mechanism maintains said record by storing an entry into said always-visible window list for each of said plurality of windows that is an always-visible window.

13. A method for displaying important information in a window-based interface on a screen of a display device in a computer system, the method comprising the steps of:

displaying a plurality of windows on said screen, said plurality of windows including one or more always-visible windows;

displaying said important information in an always-visible window of said plurality of windows;

receiving user input that would cause a selected window of said plurality of windows to cover a portion of said always-visible window;

if said selected window is an always-visible window, then preventing said selected window from overlapping with said always-visible window; and if said selected window is not an always-visible window, then displaying on said screen said always-visible window on top of said selected window.

14. The method of claim 13 further comprising the step of detecting when said user input would cause said selected window to overlap any of said one or more always-visible windows by performing the steps of:

- storing orientation data that indicates a region of the screen that corresponds to each of said one or more always-visible windows;
- detecting when an attempt is made to display said selected window in a new region on said screen; and
- comparing the new region with the orientation data to determine if the new region intersects with the region of the screen that corresponds to any of said one or more always-visible windows.

15. The method of claim 13 further comprising the step of:

- maintaining a stack order for said plurality of windows;
- displaying said plurality of windows on said screen responsive to said stack order, wherein if any windows of said plurality of windows overlap, then the window with a higher position in said stack order is displayed above the windows with which it overlaps;
- detecting when said user input would cause any window that is not an always-visible window to assume a higher position in a stack order than any of said one or more always-visible windows; and
- causing said any window to assume a position in said stack order that is lower than all of said one or more always-visible windows.

16. The method of claim 13 further comprising the step of designating said always-visible window as an always-visible window by performing the step of setting an override-redirect attribute of said always-visible window.

17. The method of claim 13 further comprising the step of designating said always-visible window as an always-visible window by performing the steps of:

- creating an always-visible window list; and
- adding to said always-visible window list an entry that corresponds to said always-visible window.

18. The method of claim 17 wherein said step of creating an always-visible window list includes establishing said always-visible window list as a property of a root window.

19. The method of claim 17 wherein said entry includes a window identifier, a location indicator, a size indicator and a stacking order indicator for said always visible window.

20. The method of claim 19 wherein said entry further includes data that indicates whether said always visible window is mapped.

21. A computer-readable medium that has stored thereon sequences of instructions which, when executed by a processor, cause the processor to perform the method recited in claim 13.

* * * * *

UNITED STATES PATENT AND TRADEMARK OFFICE
CERTIFICATE OF CORRECTION

| | | |
|---|---|---|
| PATENT NO. | : | 5,675,755 |
| DATED | : | October 7, 1997 |
| INVENTOR(S) | : | John Warren Trueblood |

It is certified that error appears in the above-identified patent and that said Letters Patent is hereby corrected as shown below:

In column 12 at line 34 delete "Manger" and insert -- Manager--.

Signed and Sealed this

Twelfth Day of October, 1999

Attest:

Q. TODD DICKINSON

Attesting Officer

Acting Commissioner of Patents and Trademarks